(12) United States Patent
Mittal et al.

(10) Patent No.: US 12,430,724 B2
(45) Date of Patent: Sep. 30, 2025

(54) AUTONOMOUSLY REMOVING SCAN MARKS FROM DIGITAL DOCUMENTS UTILIZING CONTENT-AWARE FILTERS

(71) Applicant: Adobe Inc., San Jose, CA (US)

(72) Inventors: Aishwarya Mittal, Mathura (IN); Sachin Beniwal, Hisar (IN); Abhishek Kumar Pandey, Katihar (IN)

(73) Assignee: Adobe Inc., San Jose, CA (US)

( * ) Notice: Subject to any disclaimer, the term of this patent is extended or adjusted under 35 U.S.C. 154(b) by 678 days.

(21) Appl. No.: 17/483,295

(22) Filed: Sep. 23, 2021

(65) Prior Publication Data

US 2023/0090313 A1     Mar. 23, 2023

(51) Int. Cl.
    *G06T 5/77*     (2024.01)
    *G06T 5/60*     (2024.01)
    (Continued)

(52) U.S. Cl.
    CPC .................. *G06T 5/77* (2024.01); *G06T 5/60* (2024.01); *G06T 7/11* (2017.01); *G06T 7/136* (2017.01); *G06T 2207/30176* (2013.01)

(58) Field of Classification Search
None
See application file for complete search history.

(56) References Cited

U.S. PATENT DOCUMENTS

| | | | |
|---|---|---|---|
| 5,448,376 A * | 9/1995 | Ohta | H04N 1/38 358/448 |
| 2005/0128516 A1* | 6/2005 | Tomita | H04N 1/00355 358/448 |

(Continued)

FOREIGN PATENT DOCUMENTS

| | | | | |
|---|---|---|---|---|
| CN | 111754414 A | * | 10/2020 | ............ G06F 18/24 |
| JP | 2006060520 A | * | 3/2006 | |
| JP | 2011024116 A | * | 2/2011 | |

OTHER PUBLICATIONS

Lins, "A Taxonomy for Noise in Images of Paper Documents—The Physical Noises," International Conference Image Analysis and Recognition (ICIAR), Lecture Notes in Computer Science (LNCP), vol. 5627, pp. 844-854 (Year: 2009).*

(Continued)

*Primary Examiner* — Vincent Rudolph
*Assistant Examiner* — Nicholas Crespo Stazer
(74) *Attorney, Agent, or Firm* — Keller Preece PLLC

(57) ABSTRACT

The present disclosure relates to systems, non-transitory computer-readable media, and methods for implementing content-aware filters to autonomously remove scan marks from digital documents. In particular implementations, the disclosed systems utilize a set of targeted scan mark models in a scan mark removal pipeline. For example, each scan mark model includes a corresponding content-aware filter configured to identify document regions that match a designated class of scan marks to filter. Examples of scan mark models include staple scan mark models, punch hole scan mark models, and page turn scan mark models. In certain embodiments, the disclosed systems then use the scan mark models to generate mark-specific masks based on document input features. Additionally, in some embodiments, the disclosed systems combine the mark-specific masks into a final segmentation mask and apply the final segmentation mask to the digital document for correcting the identified regions with scan marks.

20 Claims, 14 Drawing Sheets

(51) Int. Cl.
*G06T 7/11* (2017.01)
*G06T 7/136* (2017.01)

(56) References Cited

U.S. PATENT DOCUMENTS

2009/0086275 A1* 4/2009 Liang .................... G06V 10/25
358/3.21
2021/0312607 A1* 10/2021 Lin ...................... G06F 18/214

OTHER PUBLICATIONS

A. Kolesnikov and P. Fränti, Reduced-Search Dynamic Programming For Approximation Of Polygonal Curves, In Pattern Recognition Letters, vol. 24 (14), pp. 2243-2254, 2003.
U.S. Appl. No. 17/202,019, entitled Generating Modified Digital Images Using Deep Visual Guided Patch Match Models for Image Inpainting; filed on Mar. 15, 2021.

* cited by examiner

AUTONOMOUSLY REMOVING SCAN MARKS FROM DIGITAL DOCUMENTS UTILIZING CONTENT-AWARE FILTERS

BACKGROUND

Recent years have seen significant advancement in hardware and software platforms for scanning and editing digital images. In particular, many conventional digital image editing systems provide various tools that can enhance the visual appearance of a digital file, such as by removing visual artifacts from a digital document. To illustrate, image artifacts often appear in converting tangible documents (such as forms, notes, books, or academic papers) into digital documents. For example, scanned documents often include artifacts from page markings (e.g., page turns, ear marks, or bookmarks), attachment mechanisms (e.g., staple pins, punch holes, paper clips), bindings, tabs, etc. To remove the image artifacts of these scanned features, some conventional digital image editing systems provide user interface tools (e.g., digital brush tools) that can clean image artifacts from digital documents. In particular, conventional digital image editing systems implement models that rely on user interactions or user input to identify the image artifacts to remove. Unfortunately, a number of problems exist with such conventional digital image editing systems. For example, conventional digital image editing systems suffer from inflexible and inefficient operation in editing out image artifacts of a digital image.

BRIEF SUMMARY

Embodiments of the present disclosure provide benefits and/or solve one or more of the foregoing or other problems in the art with systems, non-transitory computer-readable media, and methods that implement content-aware filters to autonomously remove scan marks from digital documents. In particular, the disclosed systems can efficiently and accurately generate modified digital documents without scan marks by utilizing a set of targeted scan mark models in a scan mark removal pipeline. For example, each scan mark model includes a corresponding content-aware filter configured to identify document regions that match a designated class of scan marks to correct. Examples of scan mark models include staple scan mark models, punch hole scan mark models, and page turn scan mark models. In one or more embodiments, the scan mark models leverage corresponding content-aware filters to process input features—some of which are specific to the designated class of scan marks. In certain embodiments, the disclosed systems then use the scan mark models and corresponding content-aware filters to generate mark-specific masks based on the input features. Additionally, in some embodiments, the disclosed systems combine the mark-specific masks into a final segmentation mask and apply the final segmentation mask to the digital document to remove the identified regions with scan marks. Subsequently, in one or more embodiments, the disclosed systems fill the masked regions based on neighboring sampling data.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
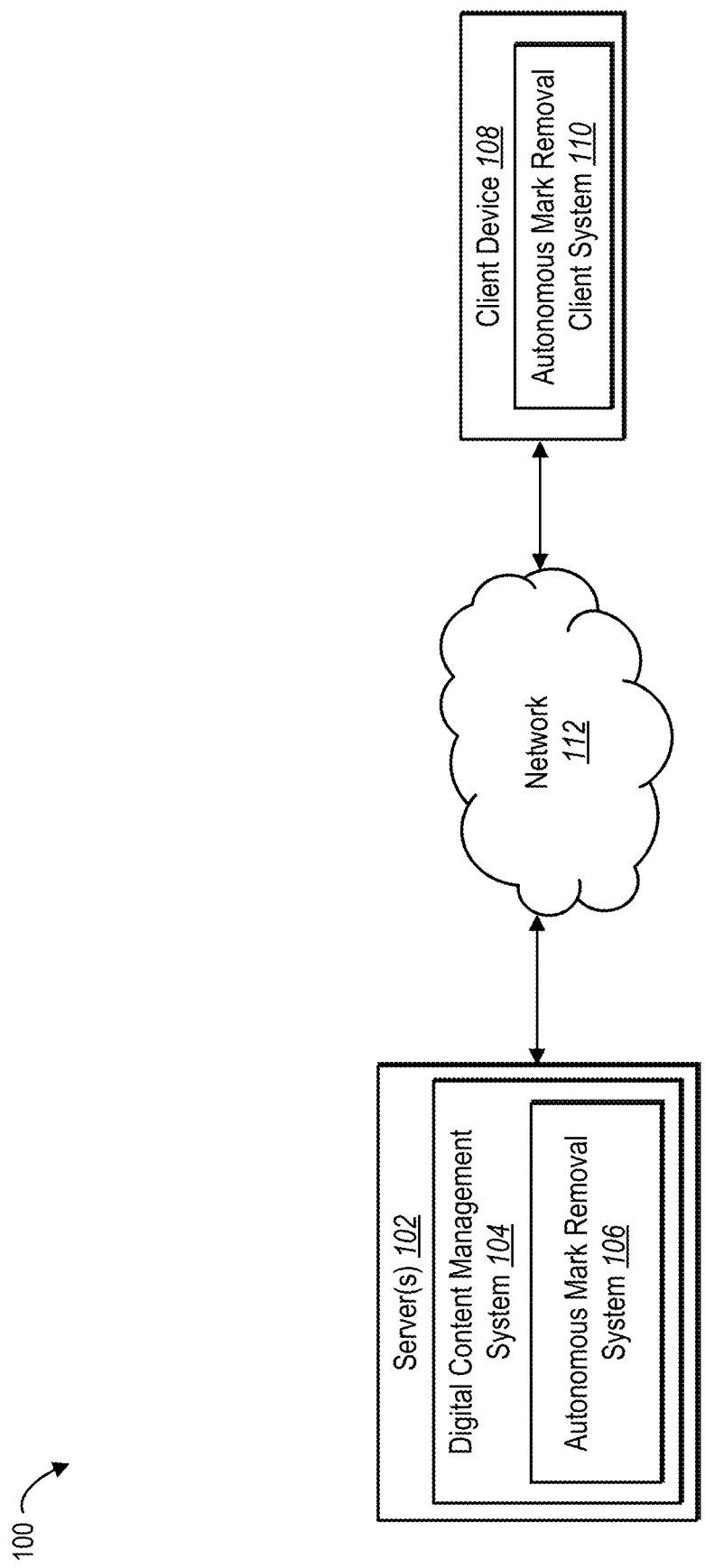
FIG. 1 illustrates a computing system environment for implementing an autonomous mark removal system in accordance with one or more embodiments.

One or more embodiments described herein include an autonomous mark removal system that intelligently and automatically corrects scanned document images by utilizing scan mark models targeted to different scan mark classes. In particular embodiments, the autonomous mark removal system utilizes specialized filtering models to remove scan marks based on detected regional features of a scanned document image. For example, in one or more embodiments, the autonomous mark removal system analyzes a scanned document and extracts page margins, text boundaries, and digital contours within the scanned document. In certain embodiments, the autonomous mark removal system utilizes separate scan mark models that each analyzes certain cues particular to a scan mark class (e.g., a staple, a punch hole, or a page turn). From the identified cues, the scan mark models generate filtered mark masks, such as a staple mask, a punch hole mask, or a page turn mask. In one or more embodiments, the autonomous mark removal system then uses the filtered mark masks to clean a scanned document image (e.g., by masking the scan marks and filling the masked regions).

As just mentioned, in certain embodiments, the autonomous mark removal system identifies document cues or features of a digital document, such margin boundaries, text boundaries, and digital contours. For example, the autonomous mark removal system identifies a page margin by identifying a difference between document edges and a bounding box that encompasses document content. Additionally, for example, the autonomous mark removal system identifies text boundaries by using optical character recognition to determine bounding boxes for each word in the digital document. Further, in one or more embodiments the autonomous mark removal system identifies digital contours by approximating closed curves of regions within the digital document.

In certain embodiments, the autonomous mark removal system then uses scan mark models to process the extracted features and generate mark-specific masks (or filtered mark masks). To illustrate, the autonomous mark removal system uses a staple scan mark model to generate a staple mask. In particular embodiments, the staple scan mark model uses filter criteria corresponding to a scan mark class for staples. With the filter criteria, the staple scan mark model identifies certain regions of the digital document to filter out via the staple mask. For example, the staple scan mark model uses a threshold region area for staples, a threshold region aspect ratio for staples, a threshold region width and height for staples, or a threshold region alignment for staples. For instance, the threshold region aspect ratio for staples includes a lower aspect ratio (e.g., less than or equal to 0.2) to identify line-shaped marks corresponding to staples. In other instances, the threshold region alignment for staples includes an angular orientation threshold relative to page edges of the digital document. In turn, the staple scan mark model can generate the staple mask based on the identified regions that correspond to the scan mark class for staples.

Similarly, in one or more embodiments, the autonomous mark removal system uses a punch hole scan mark model to generate a punch hole mask. Specifically, the punch hole scan mark model uses filter criteria such as a threshold region area for punch holes, a threshold region aspect ratio for punch holes, or a threshold region width and height for punch holes. As example filter criteria, the punch hole scan mark model uses a threshold region aspect ratio of about 0.8 (or larger) to identify circular-shaped marks corresponding to punch holes. Based on the filter criteria, the punch hole scan mark model can generate a punch hole mask to filter out the identified regions that correspond to the scan mark class for punch holes.

Additionally, in one or more embodiments, the autonomous mark removal system uses a page turn scan mark model to generate a page turn mask. In particular embodiments, the page turn scan mark model uses a different set of filter criteria corresponding to a scan mark class for page turns. For example, the page turn scan mark model filters based on contour characteristics such as a threshold number of contour corners. In certain cases, the threshold number of contour corners comprises three contour corners to identify triangular-shaped marks corresponding to page turns.

Further, in some embodiments, the scan mark models implement filter criteria based on additional input features corresponding to the page margin and the text boundaries. To illustrate, the staple scan mark model, the punch hole scan mark model, and the page turn scan mark model can analyze the page margins and text boundaries in generating various masks. To illustrate, the autonomous mark removal system can exclude a region from a mask if the region is positioned within a threshold distance of the page margin. Similarly, the autonomous mark removal system can exclude a region from a mask if the region overlaps a text boundary. In this manner, the scan mark models can generate filtered mark masks that preserve significant document content.

In one or more embodiments, the autonomous mark removal system combines the filtered mark masks to generate a final segmentation mask. For example, the autonomous mark removal system combines the staple mask, the punch hole mask, and the page turn mask such that the final segmentation mask includes each identified region to be filtered out of the digital document. To illustrate, the autonomous mark removal system generates the final segmentation mask by determining the union of each filtered mark mask.

In certain embodiments, the autonomous mark removal system uses the filtered mark masks (or the final segmentation mask) to generate a modified digital document. For example, the autonomous mark removal system applies the final segmentation mask to the digital document. Based on the application of the final segmentation mask to the digital document, the autonomous mark removal system generates masked regions that are positioned (or layered) on top of identified regions with scan marks. In one or more embodiments, the autonomous mark removal system then fills the masked regions (e.g., using neighboring pixel color values) to blend the scan marks to surrounding pixels of neighboring regions. Accordingly, the autonomous mark removal system generates modified digital documents that reduces or eliminates scan marks.

In one or more embodiments, the autonomous mark removal system then transmits the modified digital document for printing, digital storing, or digital sharing (e.g., via electronic communication). For example, the autonomous mark removal system causes an implementing client device to transmit the modified digital document to one or more printer system components for printing the modified digital document.

As mentioned above, a number of problems exist with conventional digital image editing systems, particularly with regard to flexibility and efficiency of implementing computing devices. For example, conventional systems are inefficient because they require excessive user interfaces and user interactions to identify and correct regions containing scan marks. To illustrate, conventional systems often utilize a digital brush or segmentation tool to correct a scanned digital image. Upon scanning, conventional systems require user input to select the tool, additional user interactions to identify the scan mark, additional user interactions to isolate (e.g., trace or surround) the scan mark, and still more user interactions to then remove the scan mark. In addition, removal of the scan mark generally leaves a hole in the digital image requiring additional user input to select a different tool and additional user interactions to fill or blend the hole. These increased user interactions and interfaces utilize excessive computer storage and processing power. Moreover, because these processes rely on user interaction, they can easily generate inaccurate digital documents (e.g., with lingering artifacts) that require additional processing.

These inefficiencies not only increase the demand on computational resources but inhibit the applicability and functionality of implementing systems. For example, it is common practice to convert large warehouses containing thousands or millions of tangible documents into a repository of digital images. The inefficiencies of conventional systems often make it impractical (or impossible) to correct scan marks in these digital images. Indeed, it is nearly impossible to apply the inefficient tools and user interactions of conventional systems in such circumstances. Accordingly, scan marks often remain in large batches of scanned digital documents and the inefficiencies of conventional systems preclude their application in such use cases.

In addition, some conventional systems are operationally inflexible due to incompatibility issues with certain implementing client devices (e.g., field scanners or printers). For example, the amount of user interactions and computing resources required makes conventional systems practically incompatible with implementing computing devices. Indeed, some implementing client devices have limited computing resources and unsophisticated (or non-existent) user interfaces. For example, in converting a warehouse of tangible documents, it is common to use a field scanner with limited processing power and user interface functionality. Therefore, such implementing client devices are unable to provide user interfaces or computing resources required to implement the various tools utilized by conventional systems.

Further, some conventional systems are operationally inflexible because such systems can only remove a single type of image artifact (although user input is required). For example, certain conventional systems can only remove punch hole marks with the aid of user input identifying a punch hole size and location. However, these systems fail to provide a flexible, comprehensive approach to removing a variety of different scan marks from different sources or document features.

In contrast, the autonomous mark removal system can improve operational efficiency and flexibility relative to conventional systems. For example, the autonomous mark removal system can generate modified digital documents with improved efficiency using a set of targeted models that autonomously remove scan marks independent of user interaction. Specifically, the autonomous mark removal system can efficiently clean digital documents by using individualized scan mark models that auto-generate filtered mark masks corresponding to designated classes of scan marks. Indeed, unlike some conventional systems, the autonomous mark removal system does not require excessive user interactions or user interfaces that use computer resources and slow processing speeds of implementing client devices. Accordingly, the autonomous mark removal system can improve a runtime speed (e.g., a scan and store/print speed) in comparison to conventional systems. Moreover, by automatically correcting scan marks using scan mark models, the autonomous mark removal system improves accuracy and avoids processing resources required to address errors resulting from tools guided by user interactions.

In addition, this increased efficiency also improves the functionality of the autonomous mark removal system. For example, the autonomous mark removal system can operate to automatically remove marks from large document batches that include thousands or millions of digital documents. Indeed, the autonomous mark removal system does not require excessive user interactions, user interfaces, and corresponding processing power to clean large repositories of scanned digital documents.

In addition, the autonomous mark removal system can provide increased compatibility with implementing client devices (e.g., scanners/printers). For example, by using scan mark models, the autonomous mark removal system can operate on client devices without user interfaces (or at least sophisticated or detailed user interfaces) and/or with limited processing capabilities. Thus, the autonomous mark removal system can be implemented in conjunction with field scanning devices, back-end servers, or printers without user interface functionality.

Further, the autonomous mark removal system can provide increased flexibility for removing a variety of different types of scan marks. Indeed, the autonomous mark removal system is not limited to removing only a single class of scan mark like some conventional tools. Rather, the autonomous mark removal system can utilize numerous different scan mark models that identify and remove a variety of scan marks. Moreover, the autonomous mark removal system can flexibly add, remove, or replace scan mark models as may be desired.

As illustrated by the foregoing discussion, the present disclosure utilizes a variety of terms to describe features and benefits of the autonomous mark removal system. Additional detail is now provided regarding the meaning of these terms. For example, as used herein, the term "digital document" includes a digital file, digital image, or digital content item (e.g., that is capable of being printed). A digital document can include a digital file in a variety of digital formats or file types (e.g., .docx, .xslx, .pdf, .jpg, etc.). Thus, a digital document can include a word processing document, a webpage, a digital document image (e.g., a .pdf reflecting scanned text, tables, or images), or a spreadsheet. In one or more embodiments, a digital document is generated by scanning a tangible document (e.g., utilizing a digital scanner/camera). Relatedly, the term "modified digital document" includes a digital document with one or more alterations, removed portions, filled regions, etc.

Additionally, as used herein, the term "scan marks" refers to one or more artifacts within a digital document created from scanning or capturing the digital document (e.g., a document, book, magazine, journal, receipt, file, etc.). In particular embodiments, scan marks include digital representations of tangible/physical items such as page markings, attachment mechanisms, or document features. For example, scan marks include representations of page markings such as page turns (or ear marks), bookmarks, or tabs. As additional examples, scan marks include representations of attachment mechanisms such as staple pins, punch holes, paper clips, clasps, or rings. Further examples of scan marks include representations of document features such as bindings for notebooks or bound documents, or center binding lines or creases for books, magazines, folders, or newspapers. Still further, scan marks can include representations of document aberrations or defects such as stains, wrinkles, smudges, tears, marker bleed, etc.

As also used herein, the term "margin boundary" refers to an edge, border, or outer region of a digital document. In particular embodiments, a margin boundary includes a bounding region that encompasses text, images, or other digital content within a digital document. For example, the margin boundary defines a margin as a spatial region or amount of whitespace positioned between a page edge of the digital document and document content. Similarly, as used herein, the term "text boundary" refers to a bounding shape (e.g., a bounding box) corresponding to alphanumeric characters or text within a digital document.

Additionally, as used herein, the term "digital contours" refers to region boundaries for individual regions (e.g., areas having definable digital characteristics) within a digital document. In particular embodiments, a digital contour includes a closed curve approximating (e.g., via polygonal approximation) an outer perimeter of a given region. For example, a digital contour can include a boundary shape encompassing a text region (e.g., a paragraph or block of text). Similarly, a digital contour can include a bounding shape that encompasses a graphic/image, a region associated with a particular pixel color value, a scan mark, a region of digital noise (e.g., a region having salt and pepper artifacts from scanning), etc.

Relatedly, the term "contour characteristics" refers to attributes of a digital contour. In particular embodiments, contour characteristics include measurable qualities that can indicate a particular class of scan marks (e.g., staples, punch holes, page turns). For example, contour characteristics include area, aspect ratio, width, height, shape, number of corners, position, orientation or alignment relative to page edges, etc.

As also used herein, the term "scan mark models" refers to computer-executable algorithms, instructions, or models for generating filtered mark masks (e.g., segmentation masks). Scan mark models can include machine learning or heuristic models that filter out scan marks within a digital document. In particular embodiments, scan mark models include heuristics for generating filtered mark masks that filter regions of a digital document based on digital contours, page margin(s), and text boundaries. Examples of a scan mark model include a stand-alone model such as a staple scan mark model, a punch hole scan mark model, and a page turn scan mark model.

A "staple scan mark model" refers to a computer-executable algorithm or instructions for identifying, filtering, or correcting a scan mark class (e.g., a classification or category of scan marks) for staples represented within a digital document. In particular embodiments, a staple scan mark model generates a staple mask (e.g., a mask that segments or isolates staple scan marks). For example, a staple scan mark model utilizes machine learning or heuristics that identify regions to filter out of a digital document. In some embodiments, the staple scan mark model identifies regions to correct based on threshold criteria (e.g., filter logic) corresponding to the scan mark class for staples, such as a threshold region aspect ratio or a threshold region alignment.

Similarly, a "punch hole scan mark model" refers to a computer-executable algorithm or instructions for identifying, filtering, or correcting a scan mark class for punch holes represented within a digital document. In particular embodiments, a punch hole scan mark model generates a punch hole mask (e.g., a mask that segments or isolates punch hole scan marks). For example, a punch hole scan mark model utilizes machine learning or heuristics that identify regions to filter out of a digital document (e.g., based on threshold criteria corresponding to the scan mark class for punch holes, such as another threshold region aspect ratio).

Further, a "page turn scan mark model" refers to a computer-executable algorithm or instructions for filtering out a scan mark class for page turns represented within a digital document. In particular embodiments, a page turn scan mark model generates a page turn mask (e.g., a mask that segments or isolates page turn scan marks). For example, a page turn scan mark model utilizes machine learning or heuristics that identify regions to filter out of a digital document (e.g., based on threshold criteria corresponding to the scan mark class for page turns, such as a threshold number of contour corners).

Additional detail will now be provided regarding the autonomous mark removal system in relation to illustrative figures portraying example embodiments and implementations of the autonomous mark removal system. For example, FIG. 1 illustrates a computing system environment (or "environment") 100 for implementing an autonomous mark removal system 106 in accordance with one or more embodiments. As shown in FIG. 1, the environment 100 includes server(s) 102, a client device 108, and a network 112. Each of the components of the environment 100 communicate (or are at least configured to communicate) via the network 112, and the network 112 may be any suitable network over which computing devices can communicate. Example networks are discussed in more detail below in relation to FIG. 7.

As further illustrated in FIG. 1, the environment 100 includes the server(s) 102. In some embodiments, the server(s) 102 comprises a content server and/or a data collection server. Additionally or alternatively, the server(s) 102 comprise an application server, a communication server, a web-hosting server, a social networking server, or a digital content management server.

Moreover, as shown in FIG. 1, the server(s) 102 implement a digital content management system 104. In one or more embodiments, the digital content management system 104 generates, receives, edits, manages, and/or stores digital documents. For example, in some instances, the digital content management system 104 accesses a digital document and transmits the digital document to the client device 108. In other instances, the digital content management system 104 receives modified digital documents for maintaining (e.g., in cloud storage hosted on the server(s) 102 via the network 112). The digital content management system 104 then provides a variety of options that the client device 108 may use to further edit the modified digital documents, share the modified digital documents, or subsequently search for, access, and view the modified digital documents.

The autonomous mark removal system 106 can efficiently clean a digital document of scan marks. To illustrate, in one or more embodiments, the autonomous mark removal system 106 generates, from a digital document comprising one or more scan marks, a margin boundary, text boundaries, and digital contours defining regions within the digital document. In certain embodiments, the autonomous mark removal system 106 generates, utilizing a plurality of scan mark models corresponding to a plurality of scan mark classes, a plurality of filtered mark masks for the plurality of scan mark classes from the margin boundary, the text boundaries, and the digital contours. In turn, the autonomous mark removal system 106 generates a modified digital document by removing the one or more scan marks utilizing the plurality of filtered mark masks corresponding to the plurality of scan mark classes.

As shown in FIG. 1, the environment 100 includes the client device 108. The client device 108 can include one of a variety of computing devices, including a printer, smartphone, tablet, smart television, desktop computer, laptop computer, virtual reality device, augmented reality device, or other computing device as described in relation to FIG. 7. Although FIG. 1 illustrates a single client device 108, in some embodiments the environment 100 includes multiple client devices 108 (e.g., a scanner device, printer device, and/or a mobile computing device connected to each other via the network 112). For instance, a scanner device can capture a tangible document and convert the tangible document to a digital document. Moreover, the mobile computing device (and/or the server(s) 102) can correct visible scan marks. The mobile computing device (and/or the server(s) 102) can transmit the modified digital document to the printing device. Moreover, in some embodiments, the client device 108 receives user input and provides information pertaining to accessing, viewing, modifying, and/or interacting with a digital document to the server(s) 102.

As shown, the client device 108 includes an autonomous mark removal client system 110. In particular embodiments, the autonomous mark removal client system 110 comprises a web application, a native application installed on the client device 108 (e.g., a mobile application, a desktop application, a plug-in application, etc.), or a cloud-based application where part of the functionality is performed by the server(s) 102. In some embodiments, the autonomous mark removal client system 110 presents or displays information to a user associated with the client device 108, including renderings of modified digital documents as provided in this disclosure.

In additional or alternative embodiments, the autonomous mark removal client system 110 represents and/or provides the same or similar functionality as described herein in connection with the autonomous mark removal system 106. In some implementations, the autonomous mark removal client system 110 supports the autonomous mark removal system 106 on the server(s) 102. Indeed, in one or more embodiments, the client device 108 includes all, or a portion of, the autonomous mark removal system 106.

In some embodiments, though not illustrated in FIG. 1, the environment 100 has a different arrangement of components and/or has a different number or set of components altogether. For example, in certain embodiments, the environment 100 includes a third-party server (e.g., for storing digital documents or other data). As another example, the client device 108 communicates directly with the server(s) 102, bypassing the network 112.

As mentioned above, the autonomous mark removal system 106 can more efficiently and more flexibly edit digital documents to remove scan marks. For example, FIG. 2 illustrates a process flow for generating a modified digital document in accordance with one or more such embodiments.

Figure 2:
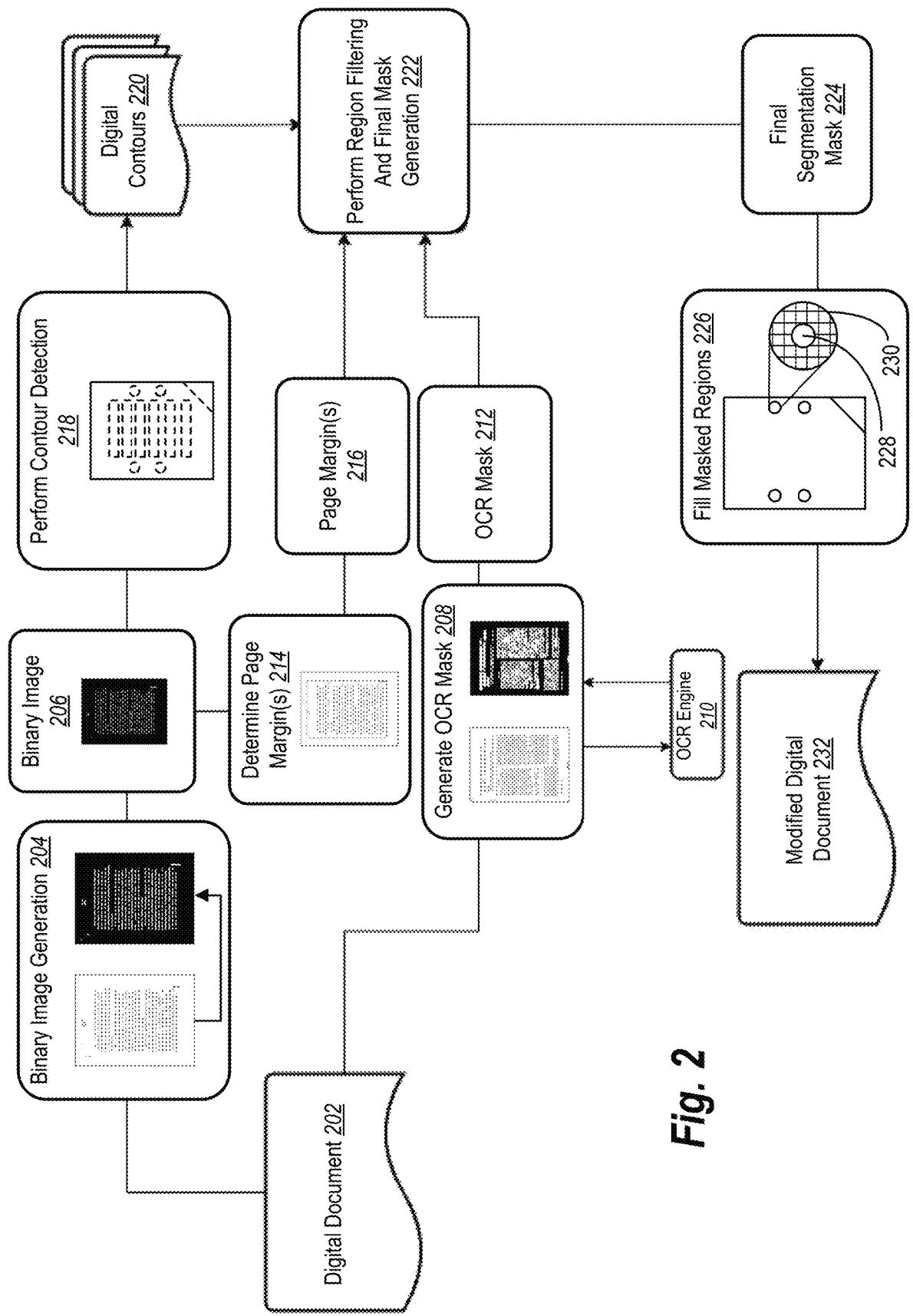
FIG. 2 illustrates a process flow for generating a modified digital document in accordance with one or more embodiments.

As shown in FIG. 2, the autonomous mark removal system 106 identifies a digital document 202 comprising one or more scan marks. To clean the scan marks from the digital document 202, the autonomous mark removal system 106 generates digital contours 220, page margin(s) 216, and an optical character recognition (OCR) mask 212. In turn, the autonomous mark removal system 106 processes these features at an act 222 for region filtering and final mask generation. Subsequently, the autonomous mark removal system 106 generates a modified digital document 232 by using a final segmentation mask 224 and filling masked regions at an act 226.

As shown in FIG. 2, the autonomous mark removal system 106 performs an act 204 for generating a binary image 206. For example, the autonomous mark removal system 106 changes background portions of the digital document 202 to a first pixel color value. In addition, the autonomous mark removal system 106 changes foreground document content within the digital document 202 to a second pixel color value. For example, the autonomous mark removal system 106 inverts the background portions of the digital document 202 to be black and the document content to be white.

Using the binary image 206, the autonomous mark removal system 106 performs an act 214 to determine page margin(s) 216 of the digital document 202. To determine the page margin(s) 216, the autonomous mark removal system 106 identifies a bounding region that encompasses foreground document content. In one or more embodiments, the autonomous mark removal system 106 then compares the bounding region relative to a page size of the digital document 202 to determine the page margin(s) 216 (e.g., a top margin, bottom margin, left-side margin, and/or right-side margin). In certain implementations, the autonomous mark removal system 106 also performs morphological operations to remove noise artifacts (e.g., salt and pepper noise) found in the binary image 206.

Also using the binary image 206, the autonomous mark removal system 106 performs an act 218 to identify digital contours 220. In one or more embodiments, the act 218 includes identifying various regions of the binary image 206. In addition, the autonomous mark removal system 106 generates closed curves that approximate the outer boundaries of the identified regions. The digital contours 220 indicate certain contour characteristics or properties corresponding to the identified regions, such as area, height, width, and position.

As illustrated in FIG. 2, the autonomous mark removal system 106 performs an act 208 to generate an OCR mask 212. In particular embodiments, the autonomous mark removal system 106 utilizes an OCR engine 210 that processes the digital document 202 to generate text boundaries corresponding to text within the digital document 202. For example, the OCR engine 210 generates the OCR mask 212 in the form of a binary image comprising white regions for detected text and black regions for other document portions.

At the act 222, the autonomous mark removal system 106 processes each of the digital contours 220, the page margin(s) 216, and the OCR mask 212. In particular embodiments, the autonomous mark removal system 106 uses a plurality of scan mark models to identify regions to filter out based on the digital contours 220. In this manner, each scan mark model of the plurality of scan mark models can identify specific types or classes of scan marks (e.g., staple scan marks, punch hole scan marks, or page turn scan marks).

Additionally, each scan mark model can verify that certain regions qualify for filtering based on the page margin(s) 216 and the OCR mask 212. For example, in certain implementations, the plurality of scan mark models exclude a region from being filtered if the region is positioned inside (or within a threshold distance from) the page margin(s) 216. Similarly, in some embodiments, the plurality of scan mark models exclude a region from being filtered if the region overlaps a text boundary identified according to the OCR mask 212. In this manner, the autonomous mark removal system 106 can prevent incidental removal of valid document content.

Based on the identified (and verified) regions, the plurality of scan mark models generate corresponding masks (e.g., filtered mark masks) customized to remove specific scan marks in the digital document 202. For example, a staple scan mark model generates a staple mask, a punch hole scan mark model generates a punch hole mask, and a page turn scan mark model generates a page turn mask. In turn, the act 222 comprises generating the final segmentation mask 224 by combining the plurality of filtered mark masks.

After applying the final segmentation mask 224 to the digital document 202, the autonomous mark removal system 106 performs the act 226 to fill masked regions. In one or more embodiments, the autonomous mark removal system 106 fills the masked regions using pixel color values of neighboring content. For example, as shown in FIG. 2, the autonomous mark removal system 106 fills a masked region 228 corresponding to a punch hole scan mark utilizing the color values of neighboring pixels 230. In particular embodiments, the autonomous mark removal system 106 uses certain algorithmic approaches, such as content-aware fill or surround fill. Specific examples of content-aware hole-filling methods are described in U.S. patent application Ser. No. 17/202,019, entitled GENERATING MODIFIED DIGITAL IMAGES USING DEEP VISUAL GUIDED PATCH MATCH MODELS FOR IMAGE INPAINTING, the contents of which are expressly incorporated herein by reference.

In one or more embodiments, the autonomous mark removal system 106 defines the neighboring content or sampling region by generating a sampling mask. To generate a sampling mask, the autonomous mark removal system 106 performs morphological operations with respect to the final segmentation mask 224. For example, the autonomous mark removal system 106 morphs the masking (bright/white) regions in the final segmentation mask 224 (e.g., using a bigger kernel to increase the number of iterations to obtain sufficient sampling data). When performing such morphological operations, the masking region(s) grow in all directions. Subsequently, the autonomous mark removal system 106 generates the sampling mask by subtracting the original (unmodified) version of the final segmentation mask 224 from the morphed version of the final segmentation mask 224 according to function (1) as follows:

$$\text{Mask}_{sampling} = \text{Morph}(\text{Mask}_{final}) - \text{Mask}_{final} \quad (1)$$

Subsequently, in one or more embodiments, the autonomous mark removal system 106 extracts sampling data (e.g., pixel color values of pixels) captured in the sampling mask. Additionally, the autonomous mark removal system 106 generates the modified digital document 232 using one or more content-fill algorithms mentioned above. For example, the autonomous mark removal system 106 generates the modified digital document 232 by using a content-fill algorithm to process the digital document 202, the final segmentation mask 224, and the sampling mask according to function (2) as follows:

$$\text{Output}=\text{ContentFill}(\text{Input},\text{Mask}_{final},\text{Mask}_{sampling}) \quad (2)$$

As discussed above, the autonomous mark removal system 106 can efficiently remove scan marks from digital documents. FIGS. 3A-3E illustrate the autonomous mark removal system 106 generating a modified digital document in accordance with one or more embodiments.

Figure 3A:
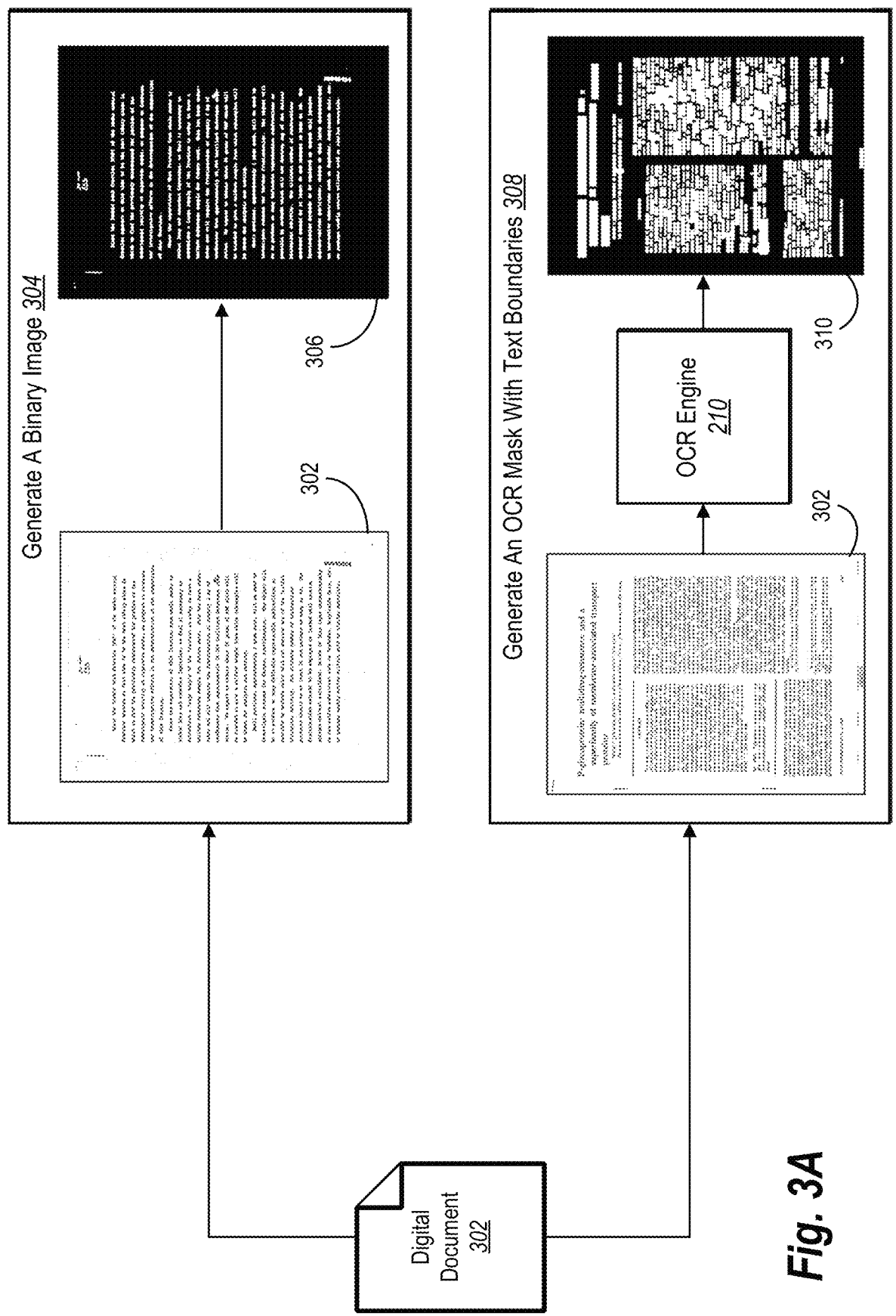
FIGS. 3A-3E illustrate an autonomous mark removal system generating a modified digital document in accordance with one or more embodiments.
Figure 3B:
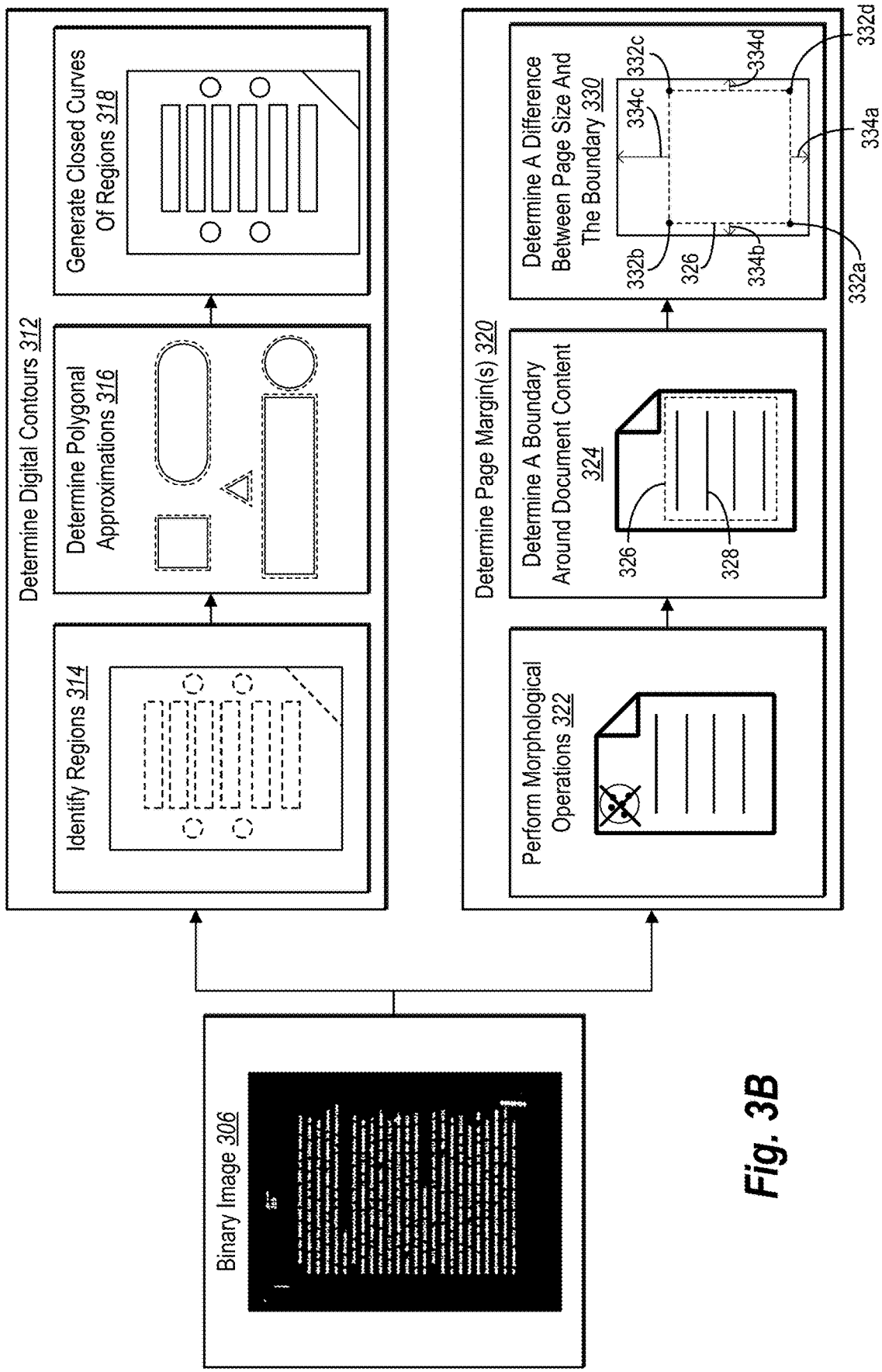
Figure 3C:
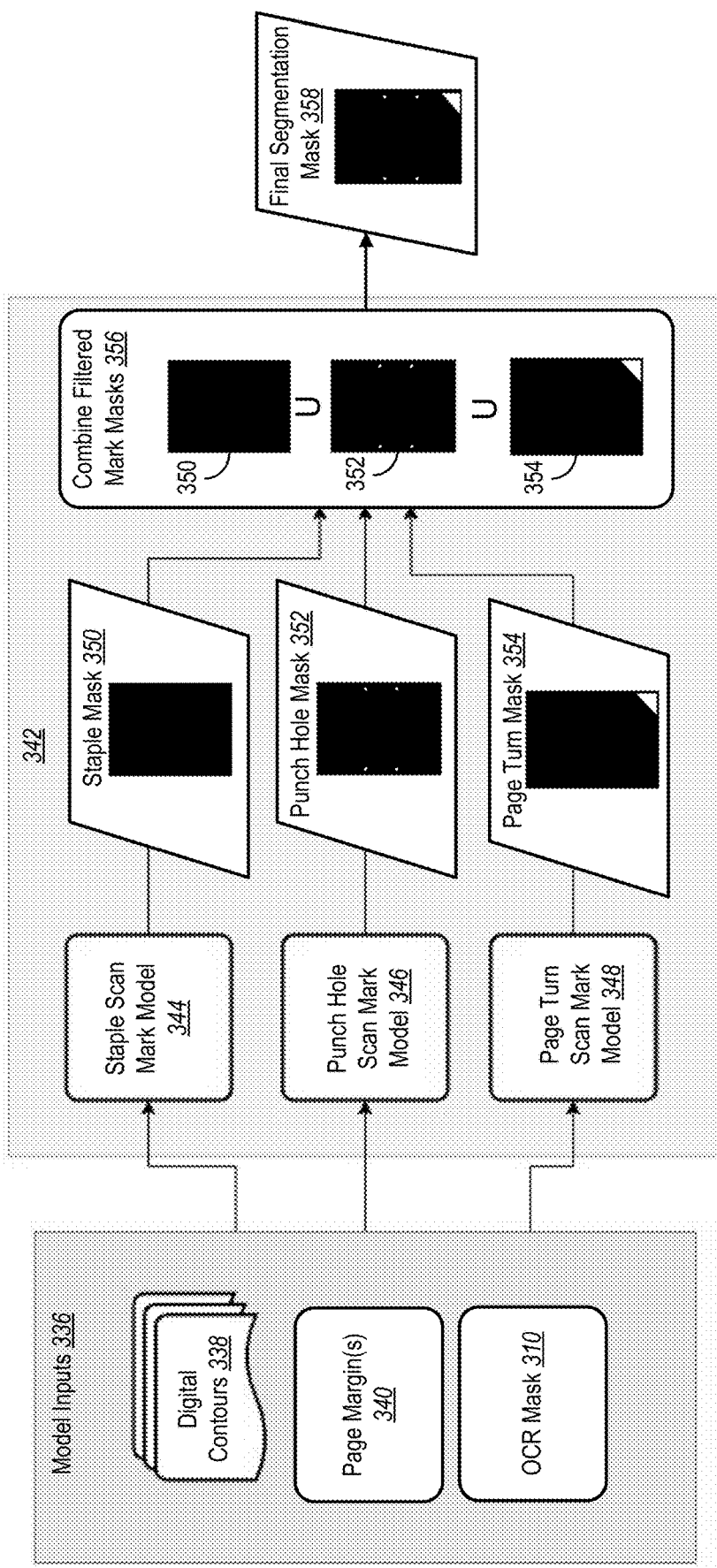
Figure 3D:
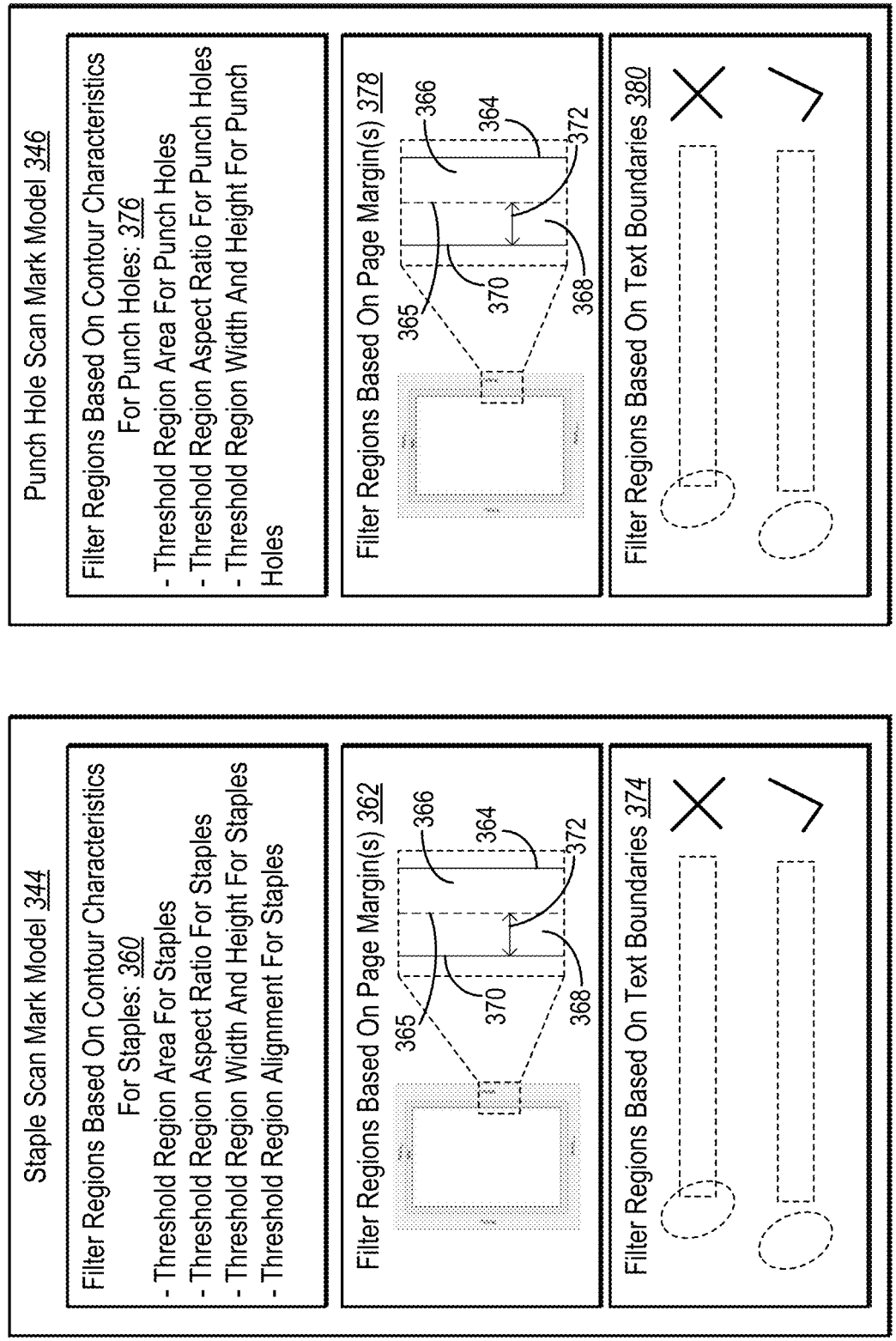
Figure 3E:
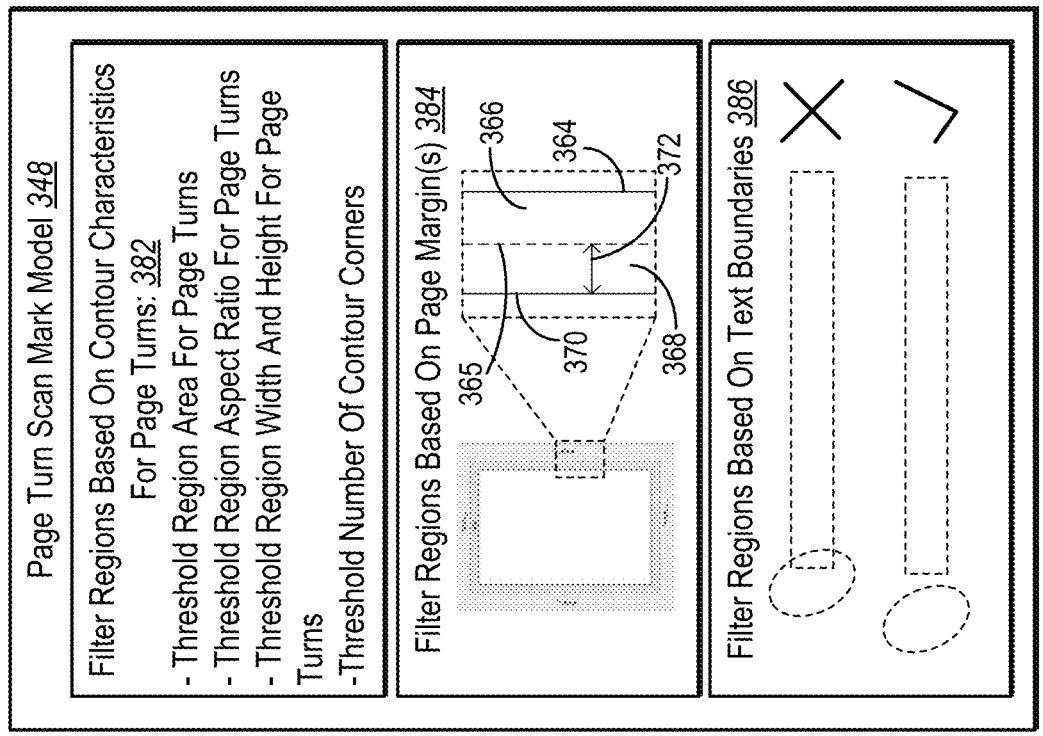

In particular FIGS. 3A-3B depict the autonomous mark removal system 106 generating digital inputs that include an OCR mask with text boundaries, digital contours, and page margin(s). Based on these digital inputs, FIGS. 3C-3E show the autonomous mark removal system 106 generating filtered mark masks to remove scan marks from a digital document.

As shown in FIG. 3A, at an act 304 the autonomous mark removal system 106 generates a binary image 306 based on a digital document 302. For example, the autonomous mark removal system 106 changes background portions of the digital document 302 to a first pixel color value and document content to a second pixel color value.

In some embodiments, the autonomous mark removal system 106 uses one or more different approaches to generating the binary image 306. To illustrate, in some embodiments, the autonomous mark removal system 106 inverts pixel color values (e.g., black to white, and white to black). For color-based scans involving more than two pixel color values (e.g., more than black and white colors), the autonomous mark removal system 106 assigns a binary pixel color value based on a grayscale distance of a given pixel's color value relative to zero for black and/or 255 for white.

In other embodiments, the autonomous mark removal system 106 converts a colored 8-bit 3-channel RGB (red, green, blue) image to a 1-bit 1-channel inverted binary image (e.g., of a same dimension as the input) according to one or more of the following operations. For instance, the autonomous mark removal system 106 converts the digital document 302 from RGB color space to LAB color space (where "LAB" stands for perceptual lightness and the four unique colors of human vision: red, green, blue, and yellow). Function (3) as follows represents the foregoing LAB conversion of the digital document 302:

$$\text{ImageLab}=\text{LAB}(\text{Image}) \quad (3)$$

where ImageLab represents the version of the digital document 302 in LAB format.

Under the same approach, the autonomous mark removal system 106 further blurs the converted LAB version of the digital document 302 using a chain of blurs (e.g., using mean based filtering and/or a gaussian kernel). Function (4) as follows represents the blurring process:

$$\text{ImageSmoothLab}=\text{Blur1}\{\text{Blur2}\ldots\text{BlurN}\{\text{ImageLab}\}\} \quad (4)$$

where ImageSmoothLab represents the blurred converted LAB version of the digital document 302.

Still further, in some embodiments, the autonomous mark removal system 106 determines a mean of the converted LAB version of the digital document 302 according to function (5) as follows:

$$\text{MeanLab}=\text{mean}(\text{ImageLab}) \quad (5)$$

where MeanLab represents the mean pixel color value of the converted LAB version of the digital document 302. Using the mean pixel color value, the autonomous mark removal system 106 can generate a corresponding distance map that reflects the distance between each pixel and the mean pixel color value. To do so, the autonomous mark removal system 106 uses one or more distance formulas. For example, in certain implementations, the autonomous mark removal system 106 generates a distance map according to function (6) using Euclidean Distances:

$$\text{DistanceMap}=\text{Distance}(\text{ImageSmoothLab}, \text{MeanLab}) \quad (6)$$

In some embodiments, the autonomous mark removal system 106 normalizes the distance map according to function (7) as follows:

$$\text{DistanceNorm}=\text{Norm}(\text{DistanceMap}) \quad (7)$$

In certain implementations, the autonomous mark removal system 106 further uses the normalized distance map to determine a threshold pixel color value that determines whether a given pixel is assigned a first binary pixel color value or a second binary pixel color value. For example, the autonomous mark removal system 106 determines the threshold pixel color value according to function (8) that represents the linear combination of mean and standard deviation of pixel color values in the normalized distance map:

$$\text{thresholdValue}=a*\text{mean}(\text{DistanceNorm})+b*\text{std}(\text{DistanceNorm}) \quad (8)$$

where a and b are learned constants and std represents the standard deviation function.

Using the threshold pixel color value, the autonomous mark removal system 106 generates the binary image 306 by comparing each pixel of the digital document 302 to the threshold pixel color value according to function (9) as follows:

$$\text{BinaryImage}=\text{threshold}(\text{Image}, \text{thresholdValue})$$

where threshold represents a threshold comparison function, and BinaryImage represents the binary image 306. For example, the autonomous mark removal system 106 assigns a given pixel of the digital document 302 a first binary pixel color value if a pixel color value of the given pixel is less than (or equal to) the threshold pixel color value. In contrast, the autonomous mark removal system 106 assigns the given pixel a second binary pixel color value if the pixel color value of the given pixel is greater than (or equal to) the threshold pixel color value.

At an act 308, the autonomous mark removal system 106 generates an OCR mask 310 with text boundaries identifying the text regions within the digital document 302. Specifically, the OCR mask 310 comprises the text segmentation mask for the digital document 302. Accordingly, the OCR mask 310 comprises a binary image in which the text regions correspond to one binary pixel color value (e.g., white) and non-textual regions correspond to another binary pixel color value (e.g., black). Moreover, as will be discussed below, the autonomous mark removal system 106 uses the OCR mask 310 to exclude text from filtering masks.

In one or more embodiments, the autonomous mark removal system 106 performs certain operations to generate the OCR mask 310. For example, the autonomous mark removal system 106 creates an empty mask. In addition, the autonomous mark removal system 106 uses the OCR engine 210 to process the digital document 302. In certain implementations, the OCR engine 210 uses one or more different text recognition algorithms. In specific embodiments, the OCR engine 210 includes one or more algorithms associated with the Tesseract OCR with pretrained text recognition model(s) for determining the bounding box of each word or alphanumeric character/sequence in the digital document 302. In turn, the autonomous mark removal system 106 marks regions in the empty mask that correspond to regions with identified text. Subsequently, the autonomous mark removal system 106 marks the bounding boxes or text boundaries for each word or alphanumeric character/sequence in the mask to generate the OCR mask 310.

In FIG. 3B, the autonomous mark removal system 106 further generates digital contours and page margin(s) based on the binary image 306. For example, at an act 312, the autonomous mark removal system 106 performs a combination of acts 314-316 for determining the digital contours. Specifically, at the act 314, the autonomous mark removal system 106 identifies regions within the binary image 306. In particular embodiments, the act 314 comprises identifying portions of the binary image 306 that have one or more common characteristics, such as a particular pixel color value, a pixel color gradient, texture, etc. In additional or alternative embodiments, the autonomous mark removal system 106 identifies regions using image segmentation approaches, such as histogram-based techniques, edge-based techniques, region-based techniques, Markov random field-based techniques, or a combination of the foregoing.

At the act 316, the autonomous mark removal system 106 determines polygonal approximations of the identified regions. In particular embodiments, the autonomous mark removal system 106 determines polygonal approximations by fitting or arranging one or more types of polygons within the identified region. To do so, in some embodiments, the autonomous mark removal system 106 uses optimization approaches. For example, the autonomous mark removal system 106 can determine polygonal approximations of the identified regions using optimization approaches that include dynamic programming to search and detect points along a curve as described in A. Kolesnikov and P. Fränti, *Reduced-Search Dynamic Programming For Approximation Of Polygonal Curves*, In Pattern Recognition Letters, vol. 24 (14), pp. 2243-2254, 2003, the contents of which are expressly incorporated herein by reference.

Alternatively, at the act 316, it will be appreciated that other types of approximations are within the scope of the present disclosure.

At the act 318, the autonomous mark removal system 106 generates closed curves of the identified regions. In particular embodiments, the autonomous mark removal system 106 generates the closed curves based on the polygonal approximations. For example, the autonomous mark removal system 106 generates, for each polygonal approximation, a continuous line, spline, or curve that follows the polygonal approximation along its perimeter. This generated shape is the digital contour of the region. Moreover, as will be discussed below, the autonomous mark removal system 106 uses the digital contour of a region when analyzing contour characteristics during the region-filtering process.

At the act 320, the autonomous mark removal system 106 performs a series of acts 322, 324, and 330 for determining page margin(s). In particular, at the act 322, the autonomous mark removal system 106 performs morphological operations with respect to the binary image 306. By performing such morphological operations, the autonomous mark removal system 106 can remove small noise such as salt and pepper noise or other minor scan artifacts. In certain embodiments, the autonomous mark removal system 106 uses one or more particular morphological operations. For example, the autonomous mark removal system 106 performs dilation and/or erosion over one or more iterations. In certain implementations, the autonomous mark removal system 106 further uses a small square kernel.

At the act 324, the autonomous mark removal system 106 determines a boundary 326 around document content 328 that represents the foreground content of the digital document 302. To determine the boundary 326, the system determines a border that includes all of the document content 328 such that border does not cut off or exclude one or more portions of the document content 328. In particular embodiments, the boundary 326 surrounds all non-zero pixel color values (e.g., all portions of the binary image 306 corresponding to white, textual regions). In certain implementations, the boundary 326 comprises a minimum area rectangle (e.g., the smallest possible rectangular border around the document content 328).

At the act 330, the autonomous mark removal system 106 determines a difference between a page size of the binary image 306 (e.g., a same size as the digital document 302) and the boundary 326. In some embodiments, the autonomous mark removal system 106 implements one or more different approaches to determining a comparative difference between the page size and the boundary 326. For example, in some embodiments, the autonomous mark removal system 106 determines one or more of page margins 334a-334d based on at least one of position or area of the boundary 326 relative to the binary image 306 or associated page edges.

In some embodiments, the autonomous mark removal system 106 determines one or more of the page margins 334a-334d based on coordinates 332a-332d for the boundary 326. For instance, the autonomous mark removal system 106 determines the page margin 334a by determining a longitudinal (e.g., a vertical direction or top-to-bottom direction) difference between one or more of the coordinates 332a, 332d and a bottom page edge. Similarly, the autonomous mark removal system 106 determines the page margin 334b by determining a latitude (e.g., a horizontal direction or side-to-side lateral direction) difference between one or more of the coordinates 332a, 332b and a left-side page edge. Further, the autonomous mark removal system 106 determines the page margin 334c by determining a longitudinal difference between one or more of the coordinates 332b, 332c and a top page edge. Additionally, the autonomous mark removal system 106 determines the page margin 334d by determining a latitude difference between one or more of the coordinates 332c, 332d and a right-side page edge.

As mentioned previously, FIGS. 3C-3E show the autonomous mark removal system 106 generating filtered mark masks to remove scan marks from a digital document. In particular, FIG. 3C shows the autonomous mark removal system 106 performing an act 342 to generate a final segmentation mask 358 based on model inputs 336. The model inputs 336 comprise digital contours 338, page margin(s) 340, and the OCR mask 310 described above in relation to FIGS. 3A-3B.

Moreover, as shown in FIG. 3C, the autonomous mark removal system 106 uses each of the model inputs 336 to generate filtered mark masks via the plurality of scan mark models. For example, a staple scan mark model 344, a punch hole scan mark model 346, and a page turn scan mark model 348 each use the model inputs 336 to generate a corresponding filtered mark mask that filters out a particular class of scan marks. For example, each filtered mark mask comprises a binary image having a pixel color value of 255 (white color) for identified regions to filter out and a pixel color value of zero (black color) for remaining portions not to be filtered. Additional details are left to FIGS. 3D-3E describing how each scan mark model processes the model inputs 336 to generate a respective filtered mark mask.

As shown in FIG. 3C, the staple scan mark model 344 generates a staple mask 350. In this example staple mask, the staple scan mark model 344 did not identify any staple scan marks in the digital document 302 based on the model inputs 336. Therefore, the staple mask 350 in this instance is empty (e.g., no identified regions corresponding to staple scan marks). Further, the punch hole scan mark model 346 generates a punch hole mask 352 (e.g., selecting two pairs of regions corresponding to punch holes near side page edges). Additionally, the page turn scan mark model 348 generates a page turn mask 354 (e.g., selecting a triangular-shaped bottom-right region corresponding to a page turn).

In some embodiments, the autonomous mark removal system 106 uses the staple scan mark model 344, the punch hole scan mark model 346, and the page turn scan mark model 348 to perform certain morphological operations with respect to a generated filtered mark mask. For example, the scan mark models modify the corresponding filtered mark masks such that the identified regions for filtering are expanded or enlarged for improved scan mark coverage. To do so, in one or more embodiments, the autonomous mark removal system 106 causes the scan mark models to implement a square kernel to expand the pixel color values of 255 (e.g., the white selected regions for filtering) outwardly in an even manner or in all directions. In other embodiments, the scan mark models expand, by a threshold pixel distance, the pixel color values for the identified regions.

At an act 356, the autonomous mark removal system 106 combines filtered mark masks to generate the final segmentation mask 358. In some embodiments, the autonomous mark removal system 106 utilizes one or more different approaches to combining filtered mark masks (e.g., such that each identified scan mark is identified in a single segmentation mask). For example, the autonomous mark removal system 106 combines the staple mask 350, the punch hole mask 352, and the page turn mask 354 by determining a union of each of the staple mask 350, the punch hole mask 352, and the page turn mask 354. In other embodiments, the autonomous mark removal system 106 combines the filtered mark masks by generating a multi-layered segmentation mask such that the staple mask 350 corresponds to a first layer, the punch hole mask 352 corresponds to a second layer, and the page turn mask 354 corresponds to a third layer.

Although not illustrated in FIG. 3C, in some embodiments, the autonomous mark removal system 106 uses additional or alternative scan mark models For example, in certain implementations, the autonomous mark removal system 106 uses a paper clip scan mark model for generating a paper clip mask, a binding scan mark model for generating a binding mask, and/or a marker bleed scan mark model for generating a marker bleed mask. In this manner, the autonomous mark removal system 106 can flexibly add, remove, or replace scan mark models for generating a more comprehensive (or customized) final segmentation mask as may be desired for filtering out a variety of scan marks or noise.

As discussed above, each scan mark model generates a corresponding filtered mark mask that filters out a particular class of scan marks. FIGS. 3D-3E illustrate the staple scan mark model 344, the punch hole scan mark model 346, and the page turn scan mark model 348 individually processing the model inputs 336 to generate a corresponding filtered mark mask.

In particular, the staple scan mark model 344 performs acts 360, 362, and 374 to generate a staple mask (e.g., the staple mask 350). For example, at the act 360, the staple scan mark model 344 filters regions based on contour characteristics for staples. These contour characteristics for staples include a variety of two-dimensional and/or three-dimensional cues indicative of staple scan marks. For example, at the act 360, the staple scan mark model 344 identifies regions to filter by comparing each digital contour of the digital contours 338 to one or more threshold contour characteristics. In one or more embodiments, threshold contour characteristics include at least one of a threshold region area for staples, a threshold region aspect ratio for staples, a threshold region width and height for staples, and/or a threshold region alignment for staples.

To illustrate, the staple scan mark model 344 filters regions having more (or in some cases, less) than a threshold angle deviation of about three degrees, about ten degrees, about thirty degrees, about forty-five degrees, etc. away from a perpendicular or parallel orientation relative to a page edge. Additionally, for instance, the staple scan mark model 344 filters regions that have digital contours satisfying a minimum and/or maximum area value corresponding to staple scan marks. Likewise, the staple scan mark model 344 filters regions that have digital contours satisfying minimum and/or maximum width and height values corresponding to staple scan marks. Still further, in some embodiments, the staple scan mark model 344 filters regions having an aspect ratio of less than or equal to about 0.2—indicative of a line-type mark with a longer, more slender digital contour. The autonomous mark removal system 106 measures aspect ratio as a ratio of the minimum of contour width and height to a maximum of the contour width and height. In certain implementations, the staple scan mark model 344 uses minimum or maximum aspect ratio values to filter regions.

In one or more embodiments, the staple scan mark model 344 filters regions based on a combination of contour characteristics for staples. For example, in some embodiments, the staple scan mark model 344 filters regions based on a threshold alignment relative to a page edge and contour coordinates. To illustrate, the staple scan mark model 344 may utilize a first threshold alignment if the contour coordinates indicate a region is positioned at or near a top or bottom edge. In contrast, the staple scan mark model 344 may utilize a second threshold alignment if the contour coordinates indicate the region is positioned at or near a left-side or right-side page edge. In this manner, the staple scan mark model 344 can capture staple scan marks that typically have a horizontal orientation at or near a top/bottom page edge and staple scan marks that typically have a vertical orientation at or near a side page edge.

At the act 362, the staple scan mark model 344 filters regions based on the margin(s) 340. In particular embodiments, the staple scan mark model 344 excludes regions from being filtered based the margin(s) 340. For example, the staple scan mark model 344 prevents filtering of regions that are positioned too close to document content so that valid document content is not incidentally filtered out. Accordingly, in one or more embodiments, the autonomous mark removal system 106 compares contour coordinates corresponding to each region (or only regions identified for filtering at the act 360) and particular page locations.

To illustrate, in some embodiments, the staple scan mark model 344 excludes a region from being filtered if the region is positioned within a buffer zone 368. As shown at the act 362 of FIG. 3D, the buffer zone 368 is defined as the page area between an inner margin boundary 370 and a buffer line 365 positioned a delta distance 372 away from the inner margin boundary 370 and towards an outer margin boundary 364 (e.g., a page edge). In one or more embodiments, the delta distance 372 is a pixel distance measured by the number of pixels between the inner margin boundary 370 and the buffer line 365. Additionally, it will be appreciated that the delta distance 372 is a configurable distance—adjustable according to user selection and/or alteration of default settings.

Further, the staple scan mark model 344 filters (or permits filtering of) a region identified for filtering if the region is positioned sufficiently far away from valid document content. For example, the staple scan mark model 344 filters (or permits filtering of) a region identified for filtering if the region is positioned within an outer portion of the margin(s) 340. Specifically, as shown in FIG. 3D, the autonomous mark removal system 106 filters (or permits filtering) if a region is positioned within a page margin area 366 between the outer margin boundary 364 and the buffer line 365. In this manner, the staple scan mark model 344 only filters out staple scan marks—not valid document content.

In a similar fashion, at the act 374, the staple scan mark model 344 filters regions based on text boundaries from the OCR mask 310. In particular embodiments, the staple scan mark model 344 excludes regions from being filtered if the region is positioned on top of a text region. For example, the staple scan mark model 344 compares text boundaries and contour coordinates for each region (or just the regions identified for filtering at the act 360). Based on the comparison, the staple scan mark model 344 excludes regions from being filtered if the contour coordinates for the region indicate that the region overlaps a text boundary according to the OCR mask 310. In contrast, the staple scan mark model 344 filters (or permits filtering of) regions identified for filtering if the region does not overlap a text boundary.

In addition, the punch hole scan mark model 346 performs acts 376-380 to generate a punch hole mask (e.g., the punch hole mask 352) based on the model inputs 336. For example, at the act 376, the punch hole scan mark model 346 filters regions based on contour characteristics for punch holes. Unlike the contour characteristics for staples, the contour characteristics for punch holes include a variety of two-dimensional and/or three-dimensional cues indicative of punch hole scan marks. To illustrate, at the act 376, the punch hole scan mark model 346 identifies regions to filter by comparing each digital contour of the digital contours 338 to one or more threshold contour characteristics. In one or more embodiments, threshold contour characteristics include at least one of a threshold region area for punch holes, a threshold region aspect ratio for punch holes, and/or a threshold region width and height for punch holes.

For example, the punch hole scan mark model 346 filters regions that have digital contours satisfying a minimum and/or maximum area value corresponding to punch hole scan marks (e.g., for standard-sized punch holes). Additionally, the punch hole scan mark model 346 filters regions that have digital contours satisfying minimum and/or maximum width and height values corresponding to punch hole scan marks (e.g., such that width and height values fall within a predetermined range). Further, in some embodiments, the punch hole scan mark model 346 filters regions having an aspect ratio of greater than or equal to about 0.8—indicative of a circular-type mark with similar width and height values. In certain implementations, the punch hole scan mark model 346 uses minimum or maximum aspect ratio values to filter regions.

In addition, the punch hole scan mark model 346 performs acts 378-380 to filter regions based on the margin(s) 340 and the text boundaries of the OCR mask 310, respectively. The acts 378-380 are the same as (or similar to) the acts 362, 374 discussed above in relation to the staple scan mark model 344. In this manner, the punch hole scan mark model 346 can, independent of other scan mark models, prevent incidental filtering of regions corresponding to valid document content. For example, the punch hole scan mark model 346 may identify a region to filter out based on an aspect ratio of a corresponding digital contour exceeding a threshold aspect ratio of 0.8. However, at the act 380, the punch hole scan mark model 346 may exclude the region from filtering because the digital contour overlaps a text boundary (e.g., as may be the case for an annotation comprising a circled word).

In FIG. 3E, the page turn scan mark model 348 performs acts 382-386 to generate a page turn mask (e.g., the page turn mask 354) based on the model inputs 336. The acts 382-386 are similar to the acts described above in relation to FIG. 3D for the staple scan mark model 344 and the punch hole scan mark model 346. For example, the act 382 comprises filtering regions based on contour characteristics for page turns. In particular embodiments, the page turn scan mark model 348 filters regions based on one or more contour characteristics satisfying a threshold region area for page turns, a threshold region aspect ratio for page turns, a threshold region width and height for page turns, and/or a threshold number of contour corners. To illustrate, the page turn scan mark model 348 filters regions based on a number of contour corners having three corners—indicative of a triangular-shaped mark corresponding to page turns. Additionally or alternatively to a number of corners, the page turn scan mark model 348 filters regions based on a number of line segments composing the digital contour (e.g., three line segments) and/or a sum of internal angles generated by the digital contour (e.g., 180 degrees).

Further, the page turn scan mark model 348 performs the acts 384-386 to filter regions based on the margin(s) 340 and the text boundaries of the OCR mask 310, respectively. The acts 384-386 are the same as (or similar to) the acts 362, 374 discussed above in relation to the staple scan mark model 344. Accordingly, the page turn scan mark model 348 can limit filtering of regions to those corresponding exclusively to page turns. For example, the page turn scan mark model 348 may identify a region to filter out based on a number of contour corners for the region comprising three contour corners. However, at the act 386, the page turn scan mark model 348 may exclude the region from filtering because the digital contour overlaps a text boundary (e.g., a scribed note positioned on the page turn).

It will be appreciated that the autonomous mark removal system 106 can utilize different implementations of the staple scan mark model 344, the punch hole scan mark model 346, and/or the page turn scan mark model 348 other than those described above. For example, in addition to (or alternatively to) heuristics, the staple scan mark model 344, the punch hole scan mark model 346, and/or the page turn scan mark model 348 implement separate machine-learning model approaches. For instance, the staple scan mark model 344 implements a staple machine-learning model, the punch hole scan mark model 346 implements a punch hole machine-learning model, and/or the page turn scan mark model 348 implements a page turn machine-learning model.

As used herein, the term machine-learning model can include a model that can be tuned (e.g., trained) based on inputs to approximate unknown functions. For example, a machine-learning model can include a decision tree model, regression model, gradient boosting algorithm, or a neural network (e.g., a convolutional neural network, recurrent neural network, etc.). As an example, the autonomous mark removal system 106 may implement three discrete neural networks for the staple scan mark model 344, the punch hole scan mark model 346, and/or the page turn scan mark model 348.

To train the machine-learning models of the staple scan mark model 344, the punch hole scan mark model 346, and/or the page turn scan mark model 348, the autonomous mark removal system 106 can utilize training contour characteristics, training page margin(s), and/or training text boundaries to generate predicted regions for filtering. In turn, the autonomous mark removal system 106 can compare, via corresponding loss functions for the different models, the predicted regions for filtering with ground truth regions for filtering. In some embodiments, the autonomous mark removal system 106 can provide a digital document as input (without identified margins, contours, etc.) and the machine-learning model can predict particular scan marks (or masks) from the digital document directly. In such implementations, the autonomous mark removal system 106 can compare the predicted scan marks (predicted masks) with ground truth scan marks (ground truth masks).

Examples of loss functions include a regression loss function (e.g., a mean square error function, a quadratic loss function, an L2 loss function, a mean absolute error/L1 loss function, mean bias error). Additionally, or alternatively, the loss function can include a classification loss function (e.g., a hinge loss/multi-class SVM loss function, cross entropy loss/negative log likelihood function).

Based on the comparisons via the loss function(s), the autonomous mark removal system 106 can determine losses (e.g., probability values, confidence scores, difference values, etc.) quantifying the difference between the predicted regions for filtering and the ground truth regions for filtering. Moreover, the autonomous mark removal system 106 can use the losses to update parameters and fine-tune learned elements of the staple scan mark model 344, the punch hole scan mark model 346, and/or the page turn scan mark model 348. Additionally, this training process can be repeated over multiple learning iterations.

Figure 4A:
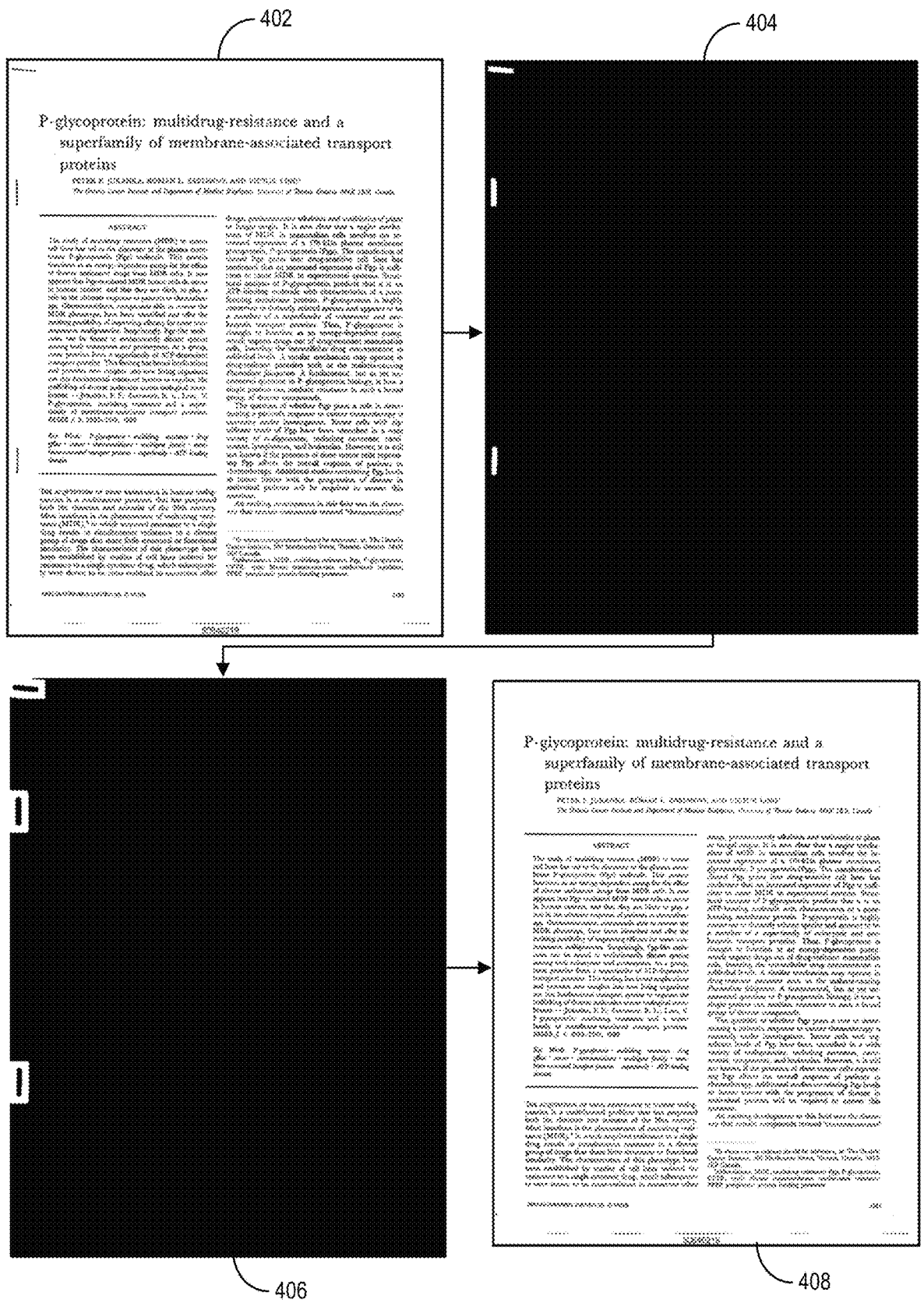
FIGS. 4A-4F illustrate experimental results of implementing an autonomous mark removal system in accordance with one or more embodiments.
Figure 4B:
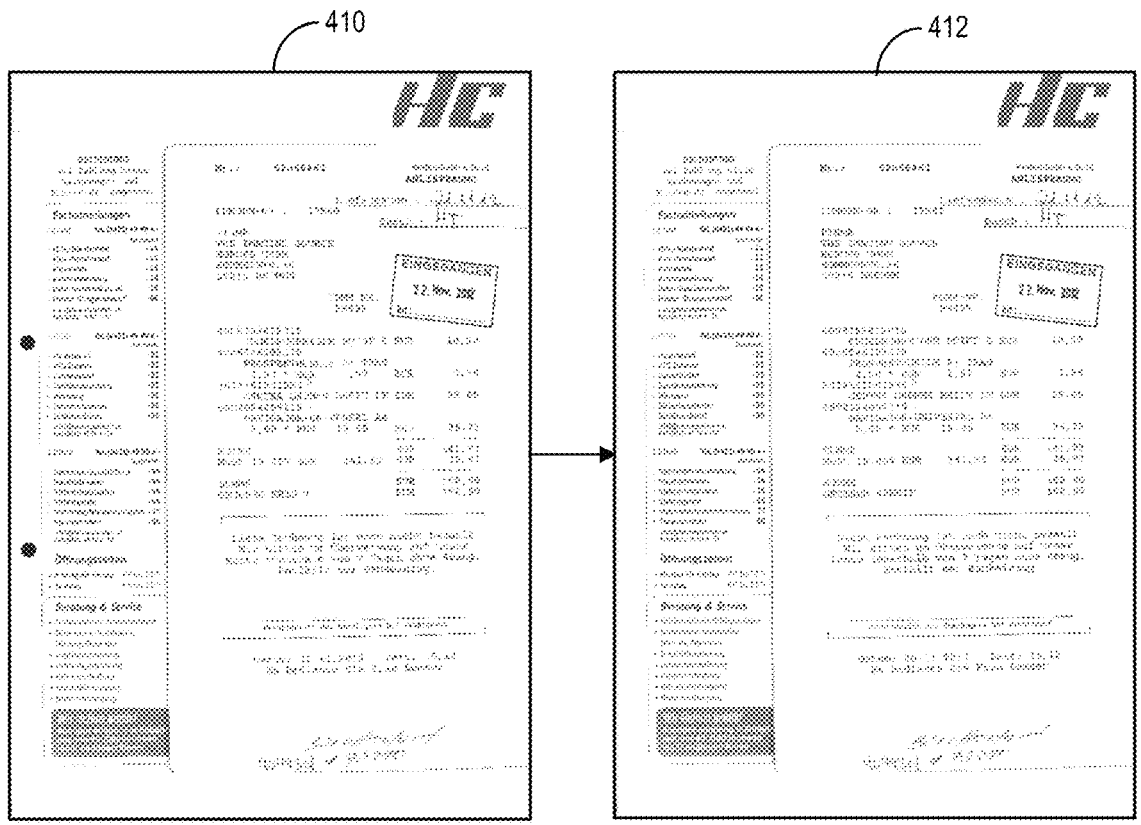
Figure 4C:
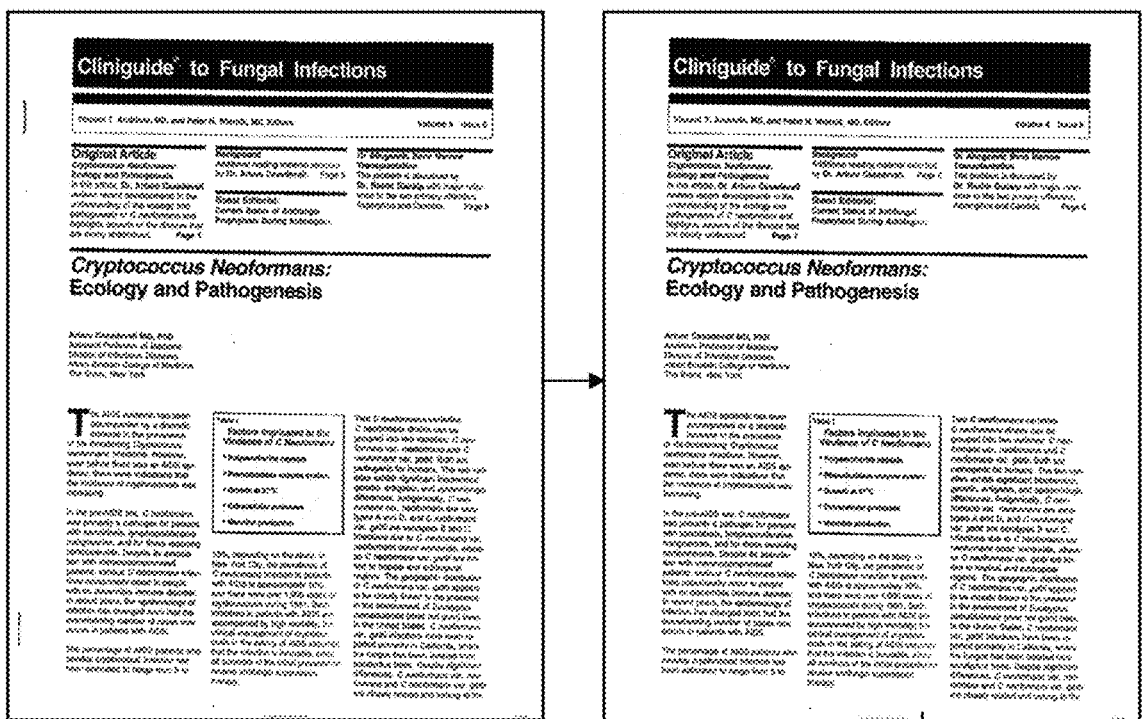

As discussed above, the autonomous mark removal system 106 can efficiently and flexibly generate modified digital documents cleaned of identified scan marks. FIGS. 4A-4F illustrate experimental results of implementing the autonomous mark removal system 106 in accordance with one or more embodiments. As shown in FIG. 4A, the autonomous mark removal system 106 processes a digital document 402 comprising staple scan marks. In particular, the autonomous mark removal system 106 uses at least a staple scan mark models to generate a final segmentation mask 404 that identifies the staple scan marks to remove from the digital document 402. For example, the staple scan mark model identifies regions to filter based on contour characteristics for staples, page margins, and text boundaries (e.g., as described above).

Based on the final segmentation mask 404, the autonomous mark removal system 106 generates a sampling mask 406 by performing morphological operations with respect to the final segmentation mask 404. For example, the autonomous mark removal system 106 morphs the masking (bright/white) regions in the final segmentation mask 404 such that the masking regions grow. In turn, the autonomous mark removal system 106 determines the difference between the morphed version of the final segmentation mask 404 and the original version of the final segmentation mask 404 to select a neighboring region around the staple scan marks from which to sample.

The autonomous mark removal system 106 then masks the staple scan marks in the digital document 402 using the final segmentation mask 404. Subsequently, the autonomous mark removal system 106 fills the masked regions using the sampling mask 406 to generate a modified digital document 408 without staple scan marks.

Further experimental results are shown in FIGS. 4B-4F. Indeed, in FIG. 4B, the autonomous mark removal system 106 processes a digital document 410 comprising punch hole scan marks and generates a modified digital document 412 without punch hole scan marks. Further, in FIG. 4C the autonomous mark removal system 106 processes a digital document 414 comprising a pair of vertical staple scan marks on the left-hand side. In response, the autonomous mark removal system 106 generates a modified digital document 416 devoid of such staple scan marks.

Figure 4D:
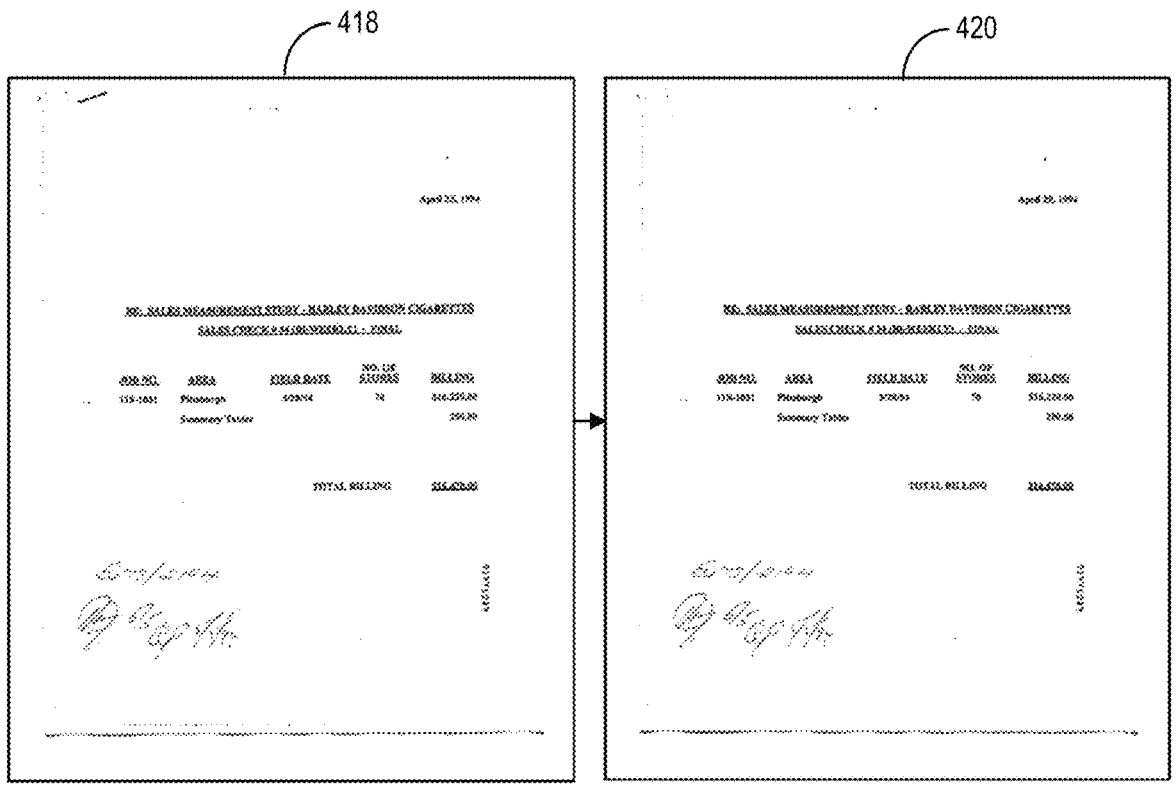
Figure 4E:
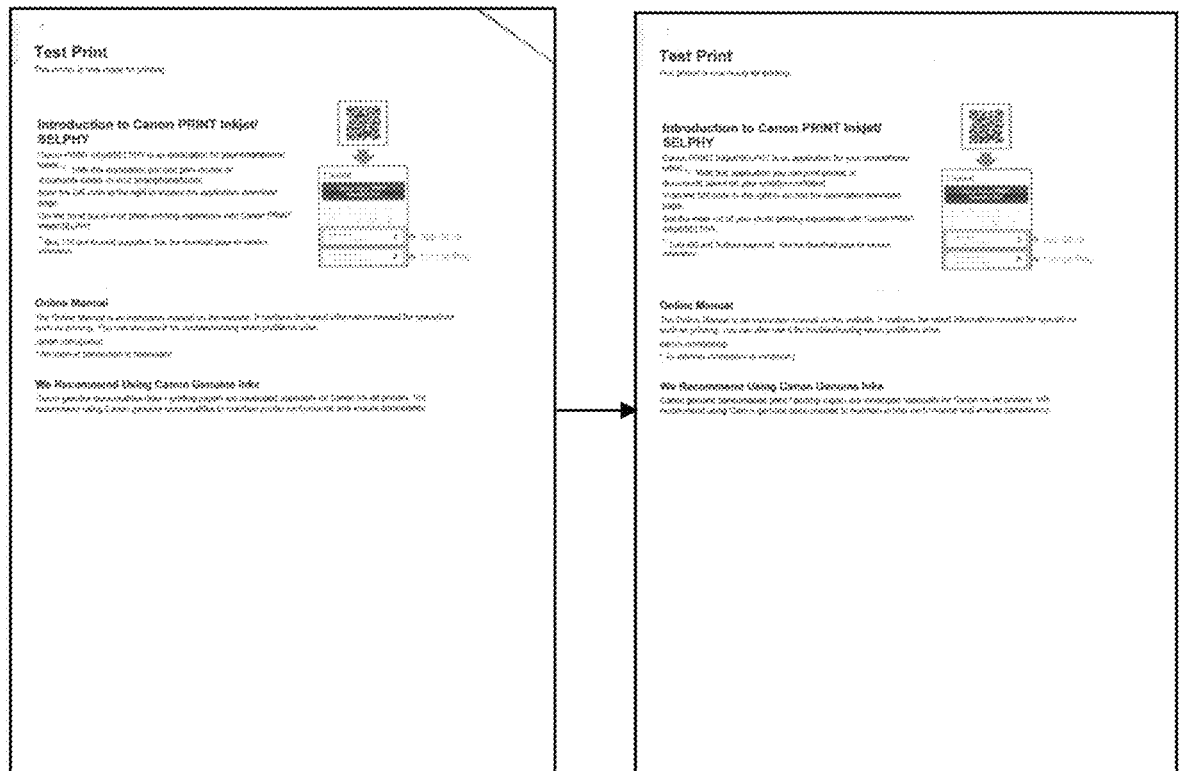
Figure 4F:
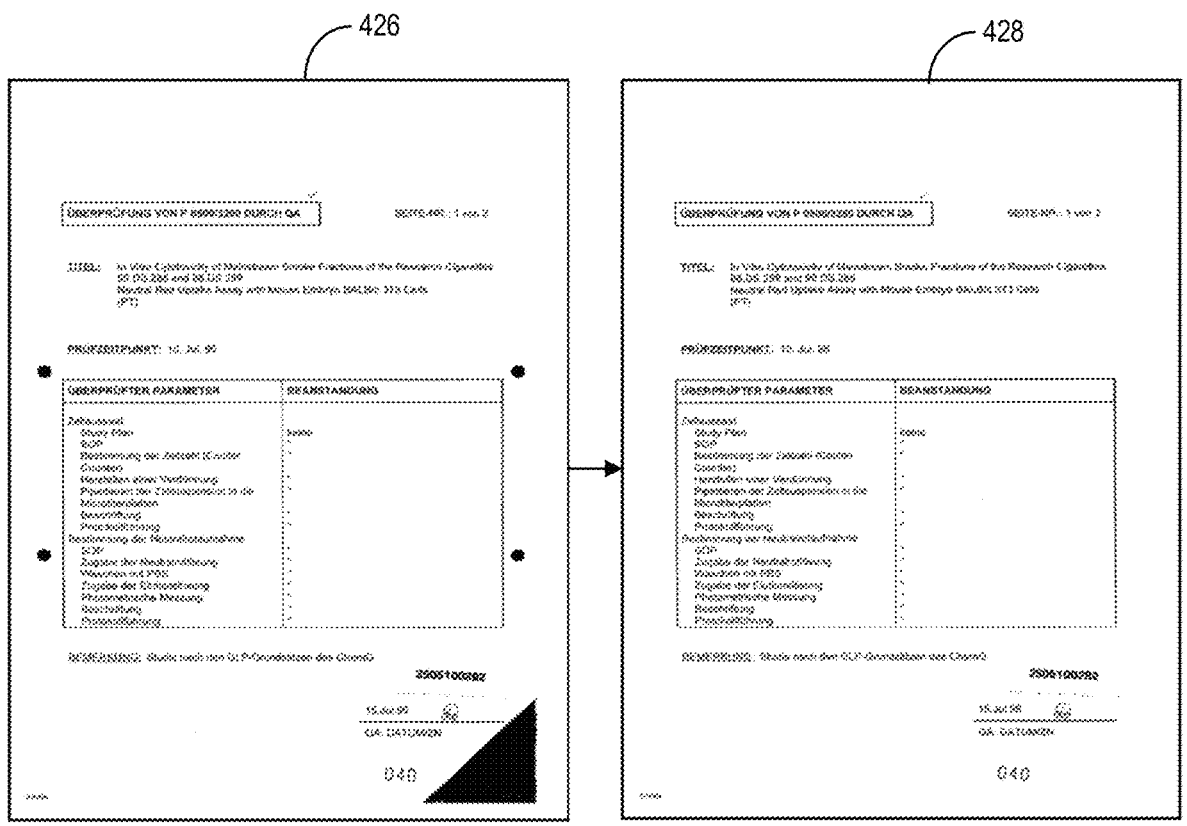

Similarly, in FIG. 4D, the autonomous mark removal system 106 processes a digital document 418 comprising a single angled staple scan mark in the top-left corner. Subsequently, the autonomous mark removal system 106 generates a modified digital document 420 with the staple scan mark removed. Additionally, in FIG. 4E, the autonomous mark removal system 106 processes a digital document 422 comprising a page turn scan mark in the upper-right corner. Based on processing the digital document 422, the autonomous mark removal system 106 generates a modified digital document 424 without the page turn scan mark. Finally, in FIG. 4F, the autonomous mark removal system 106 processes a digital document 426 comprising both punch hole scan marks and a page turn scan mark. In turn, the autonomous mark removal system 106 generates a modified digital document 428 without either of the punch hole scan marks or the page turn scan mark.

Figure 5:
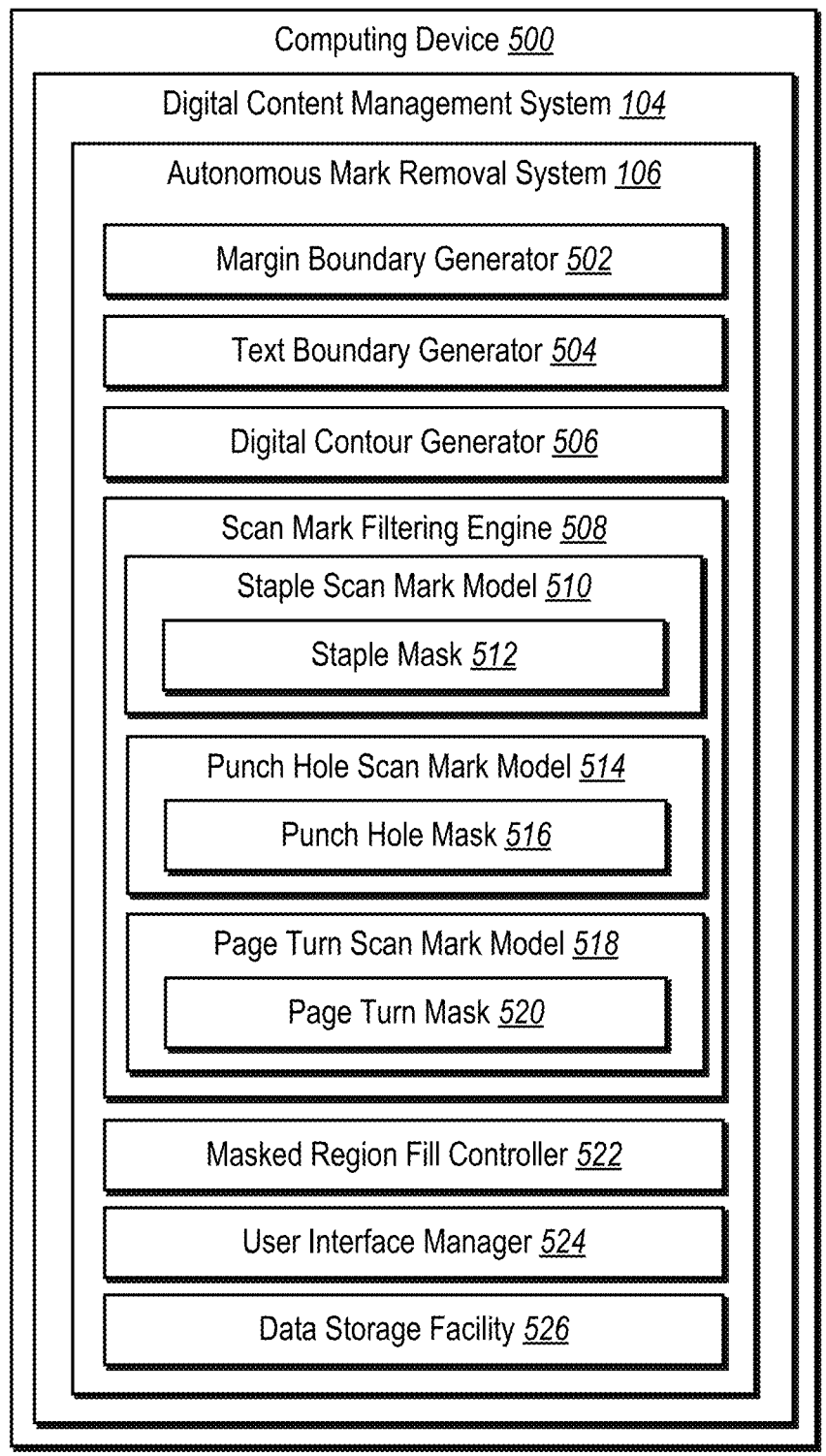
FIG. 5 illustrates an example schematic diagram of an autonomous mark removal system in accordance with one or more embodiments.

Turning to FIG. 5, additional detail will now be provided regarding various components and capabilities of the autonomous mark removal system 106. In particular, FIG. 5 illustrates an example schematic diagram of a computing device 500 (e.g., the server(s) 102 and/or the client device 108) implementing the autonomous mark removal system 106 in accordance with one or more embodiments of the present disclosure. As shown, the autonomous mark removal system 106 is implemented by the digital content management system 104. Also illustrated, the autonomous mark removal system 106 includes a margin boundary generator 502, a text boundary generator 504, a digital contour generator 506, a scan mark filtering engine 508, a masked region fill controller 522, a user interface manager 524, and a data storage facility 526.

The margin boundary generator 502 generates, obtains, retrieves, transmits, and/or stores margin boundaries of a digital document (as described in relation to the foregoing figures). In particular embodiments, the margin boundary generator 502 generates a bounding box around document content of a digital document. In turn, the margin boundary generator 502 determines a difference between the bounding box and a page size of the digital document. In one or more embodiments, the margin boundary generator 502 provides page margin(s) to the scan mark filtering engine 508 for filtering one or more regions.

The text boundary generator 504 generates, obtains, retrieves, transmits, and/or stores text boundaries of text included within a digital document (as described in relation to the foregoing figures). In particular embodiments, the text boundary generator 504 determines bounding boxes around each word or string of alphanumeric characters within the digital document based on one or more optical character recognition algorithms. In certain embodiments, the text boundary generator 504 provides text boundaries to the scan mark filtering engine 508 for filtering one or more regions.

In addition, the digital contour generator 506 generates, obtains, retrieves, transmits, and/or stores digital contours corresponding to regions of a digital document (as described in relation to the foregoing figures). In particular embodiments, the digital contour generator 506 uses polygonal approximations of identified regions to generate corresponding closed curves. Further, in some embodiments, the digital contour generator 506 provides digital contours to the scan mark filtering engine 508 for filtering one or more regions.

The scan mark filtering engine 508 comprises a plurality of scan mark models for filtering regions associated with scan marks (as described in relation to the foregoing figures). As shown in FIG. 5, the scan mark filtering engine 508 comprises a staple scan mark model 510, a punch hole scan mark model 514, and a page turn scan mark model 518. Using the plurality of scan mark models, the autonomous mark removal system 106 generates corresponding filtered mark masks. Specifically, the staple scan mark model 510 generates a staple mask 512 that filters out staple scan marks. Further, the punch hole scan mark model 514 generates a punch hole mask 516 that filters out punch hole scan marks, and the page turn scan mark model 518 generates a page turn mask 520 that filters out page turn scan marks.

In addition, the masked region fill controller 522 fills one or more masked regions (as described in relation to the foregoing figures). In particular embodiments, the masked region fill controller 522 utilizes a sampling mask to sample pixels neighboring the masked regions. For instance, the masked region fill controller 522 uses neighboring pixel color values to fill the masked regions.

In one or more embodiments, the user interface manager 524 provides, manages, and/or controls a graphical user interface (or simply "user interface"). In particular embodiments, the user interface manager 524 generates and displays a user interface by way of a display screen composed of a plurality of graphical components, objects, and/or elements that allow a user to perform a function. For example, the user interface manager 524 receives user inputs from a user, such as a click/tap to print, view, edit, interact with, or transmit a digital document. Additionally, in one or more embodiments, the user interface manager 524 presents a variety of types of information, including text, rendered modified digital documents, or other information for presentation in a user interface.

The data storage facility 526 maintains data for the autonomous mark removal system 106. The data storage facility 526 (e.g., via one or more memory devices) maintains data of any type, size, or kind, as necessary to perform the functions of the autonomous mark removal system 106. For example, the data storage facility 526 stores digital documents that include one or more scan marks.

Each of the components of the computing device 500 can include software, hardware, or both. For example, the components of the computing device 500 can include one or more instructions stored on a computer-readable storage medium and executable by processors of one or more computing devices, such as a client device or server device. When executed by the one or more processors, the computer-executable instructions of the autonomous mark removal system 106 can cause the computing device(s) (e.g., the computing device 500) to perform the methods described herein. Alternatively, the components of the computing device 500 can include hardware, such as a special-purpose processing device to perform a certain function or group of functions. Alternatively, the components of the computing device 500 can include a combination of computer-executable instructions and hardware.

Furthermore, the components of the computing device 500 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 500 may be implemented as a stand-alone application, such as a desktop or mobile application. Furthermore, the components of the computing device 500 may be implemented as one or more web-based applications hosted on a remote server.

The components of the computing device 500 may also be implemented in a suite of mobile device applications or "apps." To illustrate, the components of the computing device 500 may be implemented in an application, including but not limited to ADOBE® PDF PRINT ENGINE, PSPRINTER™, ILLUSTRATOR®, PHOTOSHOP®, LIGHTROOM®, OR ADOBE® PREMIERE®. Product names, including "ADOBE" and any other portion of one or more of the foregoing product names, may include registered trademarks or trademarks of Adobe Inc. in the United States and/or other countries.

Figure 6:
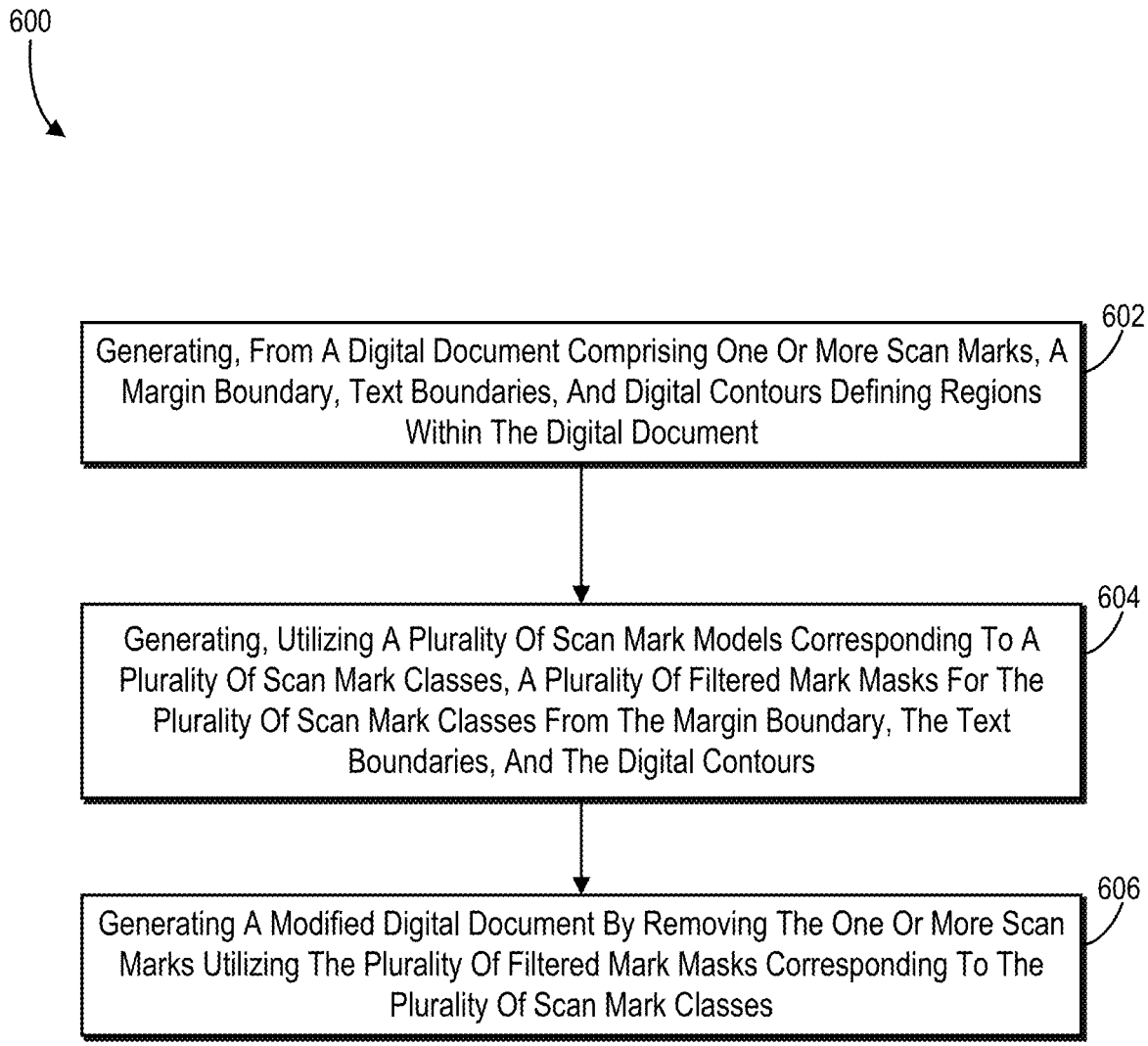
FIG. 6 illustrates a flowchart of a series of acts for generating a modified digital document in accordance with one or more embodiments.

FIGS. 1-5, the corresponding text, and the examples provide several different systems, methods, techniques, components, and/or devices of the autonomous mark removal system 106 in accordance with one or more embodiments. In addition to the above description, one or more embodiments can also be described in terms of flowcharts including acts for accomplishing a particular result. For example, FIG. 6 illustrates a flowchart of a series of acts 600 for generating a modified digital document in accordance with one or more embodiments. The autonomous mark removal system 106 may perform one or more acts of the series of acts 600 in addition to or alternatively to one or more acts described in conjunction with other figures. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6.

As shown, the series of acts 600 includes an act 602 of generating, from a digital document comprising one or more scan marks, a margin boundary, text boundaries, and digital contours defining regions within the digital document.

The series of acts 600 also includes an act 604 of generating, utilizing a plurality of scan mark models corresponding to a plurality of scan mark classes, a plurality of filtered mark masks for the plurality of scan mark classes from the margin boundary, the text boundaries, and the digital contours. In some embodiments, generating the plurality of filtered mark masks comprises: identifying a subset of regions to filter based on contour characteristics of digital contours for the subset of regions; and validating the subset of regions based on the margin boundary and the text boundaries.

In addition, the series of acts 600 includes an act 606 of generating a modified digital document by removing the one or more scan marks utilizing the plurality of filtered mark masks corresponding to the plurality of scan mark classes.

It is understood that the outlined acts in the series of acts 600 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 6, act(s) in the series of acts 600 may include an act of filtering out the subset of regions based on the contour characteristics satisfying at least one of a threshold region area, a threshold region aspect ratio, a threshold region width and region height, a threshold region alignment relative to one or more axes, or a threshold number of contour corners.

As another example of an additional act not shown in FIG. 6, act(s) in the series of acts 600 may include an act of filtering out the subset of regions utilizing at least one of: a staple scan mark model to filter out one or more regions of the subset of regions based on one or more contour characteristics corresponding to a scan mark class for staples; a punch hole scan mark model to filter out one or more regions of the subset of regions based on one or more contour characteristics corresponding to a scan mark class for punch holes; or a page turn scan mark model to filter out one or more regions of the subset of regions based on one or more contour characteristics corresponding to a scan mark class for page turns.

As a further example of an additional act not shown in FIG. 6, act(s) in the series of acts 600 may include an act of: generating, utilizing the staple scan mark model, a staple mask of the plurality of filtered mark masks; generating, utilizing the punch hole scan mark model, a punch hole mask of the plurality of filtered mark masks; and generating, utilizing the page turn scan mark model, a page turn mask of the plurality of filtered mark masks.

In still another example of an additional act not shown in FIG. 6, act(s) in the series of acts 600 may include an act of: generating a final segmentation mask by combining the staple mask, the punch hole mask, and the page turn mask; and removing the one or more scan marks utilizing the final segmentation mask.

Additionally, another example of an additional act not shown in FIG. 6 includes act(s) in the series of acts 600 of validating the subset of regions to filter out by: excluding, from the subset of regions, one or more regions by comparing a position of the one or more regions with the margin boundary; and excluding, from the subset of regions, at least one region by comparing a position of the at least one region with the text boundaries.

In another example of an additional act not shown in FIG. 6, act(s) in the series of acts 600 may include an act of: generating the margin boundary based on a page size for the digital document and a bounding box corresponding to document content of the digital document; generating the text boundaries utilizing optical character recognition; and generating the digital contours based on polygonal approximations of the regions within the digital document.

In particular embodiments, an additional act not shown in FIG. 6 includes act(s) in the series of acts 600 of: generating, from a digital document comprising one or more scan marks, a margin boundary, text boundaries, and digital contours defining regions within the digital document; generating, utilizing a plurality of scan mark models corresponding to a plurality of scan mark classes, a plurality of filtered mark masks for the plurality of scan mark classes by: identifying a subset of regions to filter based on contour characteristics of digital contours for the subset of regions; and validating the subset of regions based on the margin boundary and the text boundaries; generating a final segmentation mask by combining the plurality of filtered mark masks; and generating a modified digital document by removing the one or more scan marks utilizing the final segmentation mask.

As another example of an additional act not shown in FIG. 6, act(s) in the series of acts 600 may include an act of: determining, for a staple scan mark model, a first set of threshold criteria corresponding to a scan mark class for staples; determining, for a punch hole scan mark model, a second set of threshold criteria corresponding to a scan mark class for punch holes; and determining, for a page turn scan mark model, a third set of threshold criteria corresponding to a scan mark class for page turns.

In yet another example of an additional act not shown in FIG. 6, act(s) in the series of acts 600 may include an act of generating the plurality of filtered mark masks by: utilizing the staple scan mark model to generate a staple mask by filtering a first region of the subset of regions based on a first contour characteristic satisfying the first set of threshold criteria; utilizing the punch hole scan mark model to generate a punch hole mask by filtering a second region of the subset of regions based on a second contour characteristic satisfying the second set of threshold criteria; and utilizing the page turn scan mark model to generate a page turn mask by filtering a third region of the subset of regions based on a third contour characteristic satisfying the third set of threshold criteria.

In a further example of an additional act not shown in FIG. 6, act(s) in the series of acts 600 may include an act of determining, for the staple scan mark model, that the first region satisfies the first set of threshold criteria by determining that the first region satisfies at least one of a first threshold region aspect ratio indicative of line marks or a threshold angular symmetry relative to a page edge of the digital document; determining, for the punch hole scan mark model, that the second region satisfies the second set of threshold criteria by determining that the second region satisfies a second threshold region aspect ratio; and determining, for the page turn scan mark model, that the third region satisfies the third set of threshold criteria by determining that the third region satisfies a threshold number of contour corners.

Additionally, in another example of an additional act not shown in FIG. 6, act(s) in the series of acts 600 may include an act of validating the subset of regions by performing at least one of: excluding, from the subset of regions, one or more regions positioned within a threshold pixel distance of the margin boundary; or excluding, from the subset of regions, one or more regions overlapping at least one of the text boundaries.

In yet another example of an additional act not shown in FIG. 6, act(s) in the series of acts 600 may include an act of combining the plurality of filtered mark masks to generate the final segmentation mask by determining a union of each filtered mark mask of the plurality of filtered mark masks.

In a further example of an additional act not shown in FIG. 6, act(s) in the series of acts 600 may include an act of: generating the margin boundary by determining a difference between a page size for the digital document and a bounding box corresponding to document content of the digital document; generating the text boundaries utilizing optical character recognition to determine bounding boxes for each string or word-based combination of alphanumeric characters in the digital document; and generating the digital contours by approximating closed curves of the regions within the digital document.

In still another example of an additional act not shown in FIG. 6, act(s) in the series of acts 600 may include an act of generating the modified digital document by filling in one or more areas previously corresponding to the one or more scan marks using at least one pixel color value of a pixel positioned within a threshold pixel distance from the one or more areas.

In particular embodiments, an additional act not shown in FIG. 6 includes act(s) in the series of acts 600 of: generating, from a digital document comprising one or more scan marks, a margin boundary, text boundaries, and digital contours defining regions within the digital document; generating, from the margin boundary, the text boundaries, and the digital contours, a segmentation mask by: generating, utilizing a staple scan mark model, a staple mask corresponding to a scan mark class for staples; generating, utilizing a punch hole scan mark model, a punch hole mask corresponding to a scan mark class for punch holes; generating, utilizing a page turn scan mark model, a page turn mask corresponding to a scan mark class for page turns; and combining the staple mask, the punch hole mask, and the page turn mask; and generating a modified digital document by removing the one or more scan marks from the digital document utilizing the segmentation mask.

In another example of an additional act not shown in FIG. 6, act(s) in the series of acts 600 may include an act of generating the staple mask, the punch hole mask, and the page turn mask by identifying one or more subsets of regions to filter out by comparing contour characteristics of the regions with a first set of threshold criteria for the scan mark class for staples, a second set of threshold criteria for the scan mark class for punch holes, and a third set of threshold criteria for the scan mark class for page turns.

In yet another example of an additional act not shown in FIG. 6, act(s) in the series of acts 600 may include an act of generating the segmentation mask by excluding, from the one or more subsets of regions, a region positioned within a threshold pixel distance of the margin boundary. Further, another example of an additional act not shown in FIG. 6 includes act(s) in the series of acts 600 of generating the segmentation mask by: excluding, from the one or more subsets of regions, a region overlapping at least one of the text boundaries.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
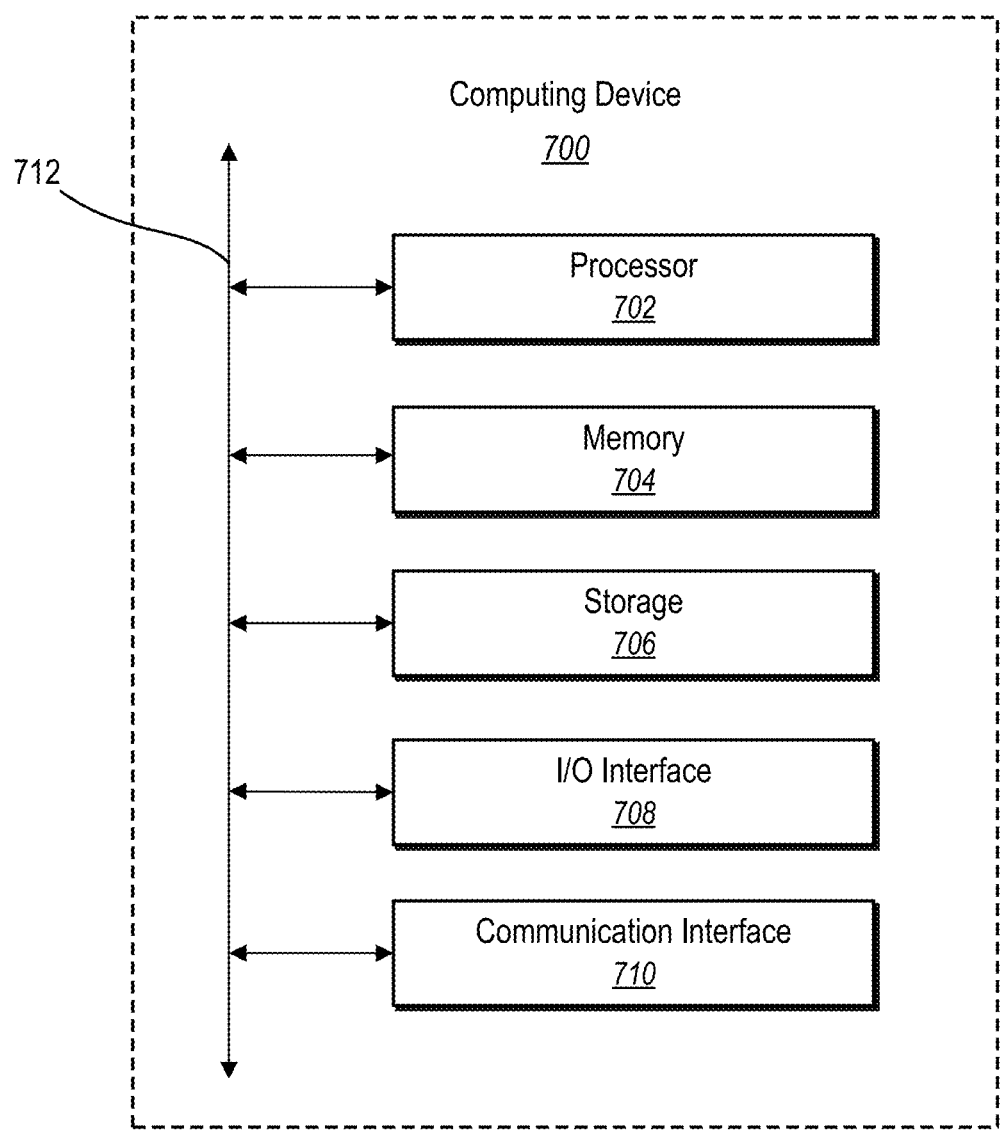
FIG. 7 illustrates a block diagram of an example computing device for implementing one or more embodiments of the present disclosure.

FIG. 7 illustrates a block diagram of an example computing device 700 that may be configured to perform one or more of the processes described above. One will appreciate that one or more computing devices, such as the computing device 700 may represent the computing devices described above (e.g., the server(s) 102, the client device 108, and/or the computing device 500). In one or more embodiments, the computing device 700 may be a mobile device (e.g., a mobile telephone, a smartphone, a PDA, a tablet, a laptop, a camera, a tracker, a watch, a wearable device, etc.). In some embodiments, the computing device 700 may be a non-mobile device (e.g., a desktop computer or another type of client device). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, the storage device 706 can include a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can include hardware, software, or both that connects components of the computing device 700 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to:
generate, from a digital document comprising one or more scan marks, a margin boundary, an OCR mask comprising a binary image having regions for detected text, and digital contours defining regions within the digital document;
generate, utilizing a staple scan mark model, a staple mask from the margin boundary, the OCR mask, and the digital contours by applying a threshold region area for staples and a threshold region width and height for staples;
generate, utilizing a punch hole scan mark model, a punch hole mask from the margin boundary, the OCR mask, and the digital contours by applying a threshold region area for punch holes and a threshold region width and height for punch holes; and
generate a modified digital document without the one or more scan marks by removing a staple region corresponding to the staple mask and a punch hole region corresponding to the punch hole mask from the digital document.

2. The non-transitory computer-readable medium of claim 1, further comprising instructions that, when executed by the at least one processor, cause the computing device to generate the staple mask from the digital contours by applying the threshold region area for staples by filtering out a region that has digital contours satisfying a maximum area value corresponding to staple scan marks.

3. The non-transitory computer-readable medium of claim 1, further comprising instructions that, when executed by the at least one processor, cause the computing device to generate the staple mask from the digital contours by applying the threshold region width and height for staples by filtering out a region that has digital contours satisfying maximum width and height values corresponding to staple scan marks.

4. The non-transitory computer-readable medium of claim 1, further comprising instructions that, when executed by the at least one processor, cause the computing device to generate the punch hole mask from the digital contours by:
applying the threshold region area for punch holes by filtering out a first region that has digital contours satisfying a maximum area value corresponding to punch hole scan marks; and
applying the threshold region width and height for punch holes by filtering out a second region that has digital contours satisfying maximum width and height values corresponding to punch hole scan marks.

5. The non-transitory computer-readable medium of claim 1, further comprising instructions that, when executed by the at least one processor, cause the computing device to:
generate, utilizing a page turn scan mark model, a page turn mask from the margin boundary, the OCR mask, and the digital contours by applying a threshold region area for page turns and a threshold region width and height for page turns; and
generate the modified digital document without the one or more scan marks further by removing a page turn region corresponding to the page turn mask from the digital document.

6. The non-transitory computer-readable medium of claim 5, further comprising instructions that, when executed by the at least one processor, cause the computing device to:
generate a final segmentation mask by combining the staple mask, the punch hole mask, and the page turn mask; and
remove the one or more scan marks utilizing the final segmentation mask.

7. The non-transitory computer-readable medium of claim 1, further comprising instructions that, when executed by the at least one processor, cause the computing device to validate the staple region and the punch hole region by:
excluding, from a subset of regions comprising the staple region and the punch hole region, one or more regions by comparing a position of the one or more regions with the margin boundary; and
excluding, from the subset of regions, at least one region by comparing a position of the at least one region with the OCR mask.

8. The non-transitory computer-readable medium of claim 1, further comprising instructions that, when executed by the at least one processor, cause the computing device to:
generate the margin boundary based on a page size for the digital document and a bounding box corresponding to document content of the digital document;
generate the OCR mask utilizing optical character recognition; and
generate the digital contours based on polygonal approximations of the regions within the digital document.

9. A system comprising:
one or more memory devices; and
one or more processors coupled to the one or more memory devices that cause the system to perform operations comprising:
generating, from a digital document comprising one or more scan marks, a margin boundary, an OCR mask comprising a binary image having regions for detected text, and digital contours defining regions within the digital document;
generating, utilizing a staple scan mark model, a staple mask from the margin boundary, the OCR mask, and the digital contours by applying a threshold region area for staples and a threshold region width and height for staples;
generating, utilizing a punch hole scan mark model, a punch hole mask from the margin boundary, the OCR mask, and the digital contours by applying a threshold region area for punch holes and a threshold region width and height for punch holes; and
generating a modified digital document without the one or more scan marks by removing a staple region corresponding to the staple mask and a punch hole region corresponding to the punch hole mask from the digital document.

10. The system of claim 9, wherein the operations further comprise generating the staple mask from the digital contours by applying the threshold region area for staples by filtering out a region that has digital contours satisfying a maximum area value corresponding to staple scan marks.

11. The system of claim 9, wherein the operations further comprise generating the staple mask from the digital contours by applying the threshold region width and height for staples by filtering out a region that has digital contours satisfying maximum width and height values corresponding to staple scan marks.

12. The system of claim 9, wherein the operations further comprise generating the punch hole mask from the digital contours by:
applying the threshold region area for punch holes by filtering out a first region that has digital contours satisfying a maximum area value corresponding to punch hole scan marks; and
applying the threshold region width and height for punch holes by filtering out a second region that has digital contours satisfying maximum width and height values corresponding to punch hole scan marks.

13. The system of claim 9, wherein the operations further comprise:
generating, utilizing a page turn scan mark model, a page turn mask from the margin boundary, the OCR mask, and the digital contours by applying a threshold region area for page turns and a threshold region width and height for page turns; and
generating the modified digital document without the one or more scan marks further by removing a page turn region corresponding to the page turn mask from the digital document.

14. The system of claim 13, wherein the operations further comprise:
generating a final segmentation mask by combining the staple mask, the punch hole mask, and the page turn mask; and
removing the one or more scan marks utilizing the final segmentation mask.

15. A computer-implemented method comprising:
generating, from a digital document comprising one or more scan marks, a margin boundary, an OCR mask comprising a binary image having regions for detected text, and digital contours defining regions within the digital document;
generating, utilizing a staple scan mark model, a staple mask from the margin boundary, the OCR mask, and the digital contours by applying a threshold region area for staples and a threshold region width and height for staples;
generating, utilizing a punch hole scan mark model, a punch hole mask from the margin boundary, the OCR mask, and the digital contours by applying a threshold region area for punch holes and a threshold region width and height for punch holes; and
generating a modified digital document without the one or more scan marks by removing a staple region corresponding to the staple mask and a punch hole region corresponding to the punch hole mask from the digital document.

16. The computer-implemented method of claim 15, further comprising generating the staple mask from the digital contours by applying the threshold region area for staples by filtering out a region that has digital contours satisfying a maximum area value corresponding to staple scan marks.

17. The computer-implemented method of claim 15, further comprising generating the staple mask from the digital contours by applying the threshold region width and height for staples by filtering out a region that has digital contours satisfying maximum width and height values corresponding to staple scan marks.

18. The computer-implemented method of claim 15, further comprising generating the punch hole mask from the digital contours by:
applying the threshold region area for punch holes by filtering out a first region that has digital contours satisfying a maximum area value corresponding to punch hole scan marks; and
applying the threshold region width and height for punch holes by filtering out a second region that has digital contours satisfying maximum width and height values corresponding to punch hole scan marks.

19. The computer-implemented method of claim 15, further comprising validating the staple region and the punch hole region by:
excluding, from a subset of regions comprising the staple region and the punch hole region, one or more regions by comparing a position of the one or more regions with the margin boundary; and
excluding, from the subset of regions, at least one region by comparing a position of the at least one region with the OCR mask.

20. The computer-implemented method of claim 15, further comprising:
generating the margin boundary based on a page size for the digital document and a bounding box corresponding to document content of the digital document;
generating the OCR mask utilizing optical character recognition; and
generating the digital contours based on polygonal approximations of the regions within the digital document.

* * * * *